(12) United States Patent
Rao et al.

(10) Patent No.: US 10,602,246 B2
(45) Date of Patent: Mar. 24, 2020

(54) HEURISTIC CONSTRAINT DRIVEN OPTICAL CHANNEL PROTECTION

(71) Applicant: Infinera Corporation, Sunnyvale, CA (US)

(72) Inventors: Rajan Rao, Fremont, CA (US); Nikhil Kumar Satyarthi, Bangalore (IN); Ashok Kunjidhapatham, Bangalore (IN); Baranidhar Ramanathan, Bangalore (IN); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/601,426

(22) Filed: May 22, 2017

(65) Prior Publication Data

US 2017/0338887 A1 Nov. 23, 2017

Related U.S. Application Data

(60) Provisional application No. 62/339,483, filed on May 20, 2016.

(51) Int. Cl.
*H04Q 11/00* (2006.01)
*H04B 10/079* (2013.01)
*H04J 14/02* (2006.01)

(52) U.S. Cl.
CPC ... *H04Q 11/0067* (2013.01); *H04B 10/07955* (2013.01); *H04J 14/0287* (2013.01); *H04J 14/0293* (2013.01); *H04Q 11/0005* (2013.01); *H04Q 2011/0081* (2013.01); *H04Q 2011/0083* (2013.01)

(58) Field of Classification Search
CPC combination set(s) only.
See application file for complete search history.

(56) References Cited

U.S. PATENT DOCUMENTS

| 2001/0026384 A1* | 10/2001 | Sakano | H04B 10/032 398/79 |
| 2006/0188253 A1* | 8/2006 | Shimada | H04B 1/745 398/31 |
| 2012/0183294 A1* | 7/2012 | Boertjes | H04J 14/0204 398/49 |

(Continued)

*Primary Examiner* — Omar S Ismail
(74) *Attorney, Agent, or Firm* — David L. Soltz

(57) ABSTRACT

Embodiments herein include methods and apparatuses for providing optical channel protection by a switching controller in an optical networking system. The switching controller may receive, from a light module, a digital fault status message that indicates whether a digital frame demodulated from an optical signal include a fault. The switching controller may receive from an Optical Supervisory Channel (OSC) module, an Optical Layer Defect Propagation (OLDP) status message that indicates an OSC status of the optical signal on a current optical path. The switching controller may receive, from an Optical Add Drop Multiplexer (OADM) module, an optical power status message that indicates a measured power level of the optical signal on the optical path. Based on at least one of the OLDP status, the optical power status, or the digital fault status message, the switching controller may determine the optical path as a working path or a protecting path.

17 Claims, 9 Drawing Sheets

(56) References Cited

U.S. PATENT DOCUMENTS

2015/0280854 A1* 10/2015 Matsukawa ............ H04J 14/022
                                                                                            398/3
2016/0259127 A1*  9/2016 Jiang ................. H04Q 11/0005
2016/0315697 A1* 10/2016 Breukelaar ......... H04J 14/0212

\* cited by examiner

HEURISTIC CONSTRAINT DRIVEN OPTICAL CHANNEL PROTECTION

CROSS REFERENCE TO RELATED APPLICATION

This application claims the benefit of U.S. provisional application No. 62/339,483 filed on May 20, 2016, which is incorporated by reference as if fully set forth herein.

FIELD OF INVENTION

The disclosed embodiments are generally directed to optical channel protection in a fiber optics network, and more specifically to super-channel protection based on digital and optical layer faults.

BACKGROUND

Communication networks, in particular fiber optics networks, are subject to a wide variety of failures caused by natural disasters, wear out, patch-cable cuts and so on. Such failures may affect network functionalities such as data transmission and reception. To circumvent these drawbacks, most fiber optics networks use channel protection schemes for its optical layer. As soon as a failure in the network is detected, these channel protection schemes may divert the affected traffic to another fault-free path in the network. For example, under a fault-free condition, the traffic is transported along a working path. However, if a failure is detected on that path, the channel protection scheme may switch the traffic to a protecting path that was not affected by the failure.

Current protection schemes at optical layers are similar to protection schemes at digital layers. Specifically, both working and protecting paths are simultaneously monitored for failure, and in case of a network failure, an Automatic Protection Switching (APS) selects a healthier channel from which to source traffic. Although current protection schemes may satisfy sub-50 millisecond requirements for traffic recovery, they are costly to implement. Thus, it would be desirable to have a method and apparatus that provides sub-50 millisecond traffic recovery without costly implementation using fast digital faults triggers in conjunction with other supporting optical fault conditions.

SUMMARY

A system and apparatus are disclosed herein for providing an optical channel protection by a switching controller in an optical networking system. The switching controller may receive, from a light module, a digital fault status message that indicates whether a digital frame demodulated from an optical signal include a fault. The optical signal may include one or more super-channel that is received from a first optical path or a second optical path. The switching controller may receive, from a first Optical Supervisory Channel (OSC) module, a first Optical Layer Defect Propagation (OLDP) status message that indicates an OSC status of the super-channel on the first optical path. The switching controller may receive, from a second OSC module, a second OLDP status message that indicates an OSC status of the super-channel on the second optical path. The switching controller may receive, from a first Optical Add Drop Multiplexer (OADM) module, a first optical power status message that indicates a first measured power level of the super-channel on the first optical path. The switching controller may receive, from a second OADM module, a second optical power status message that indicates a second measured power level of the super-channel on the second optical path.

Based on at least one of the first OLDP status message, the second OLDP status message, the first optical power status message, the second optical power status message, or the digital fault status message, the switching controller may determine the first optical path as an active path and the second optical path as a standby path. The first optical path may be operatively connected to the first OSC module, the first OADM module and the light module. The second optical path may be operatively connected to the second OSC module, the second OADM module and the light module.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENTS

Figure 1:
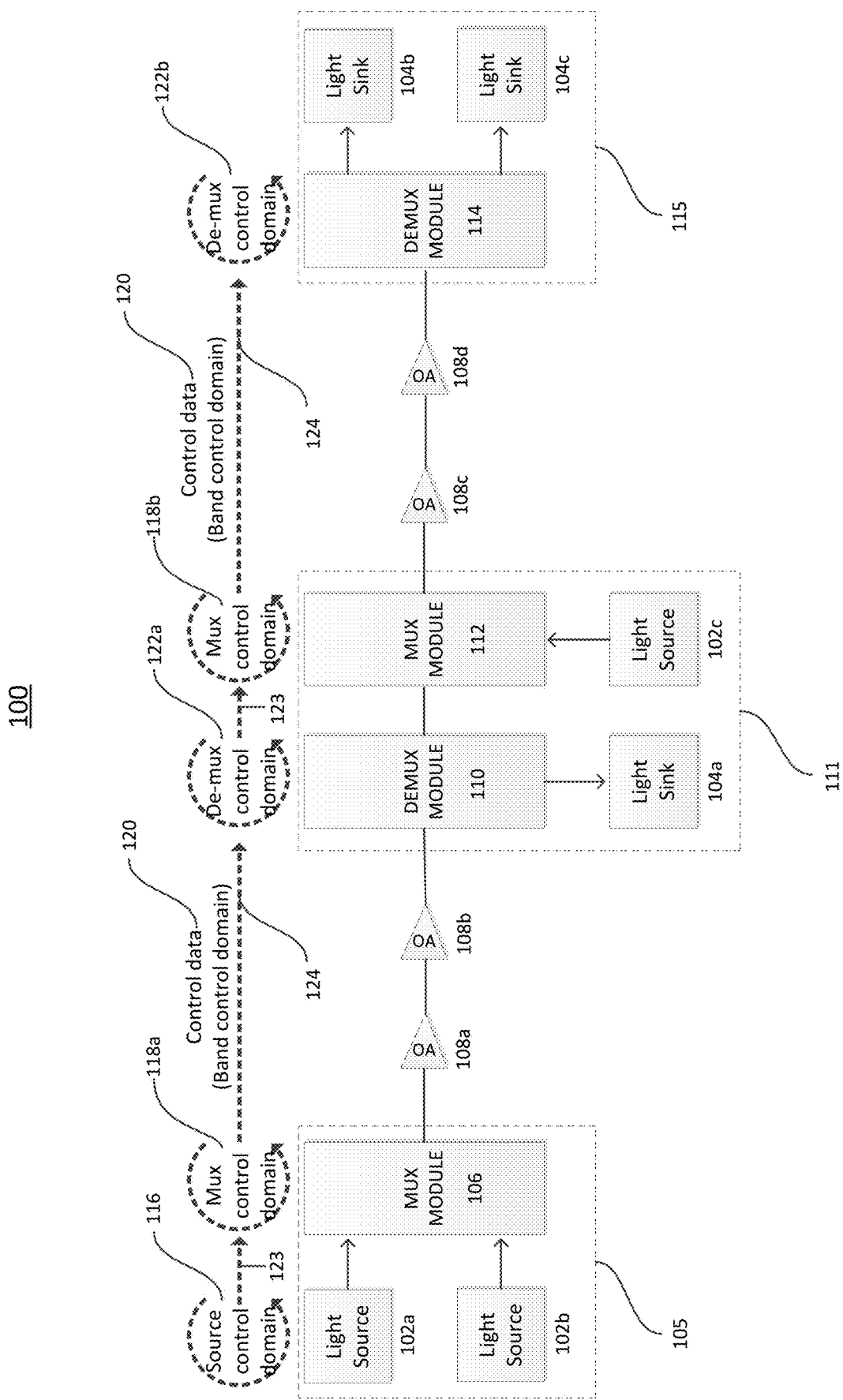
FIG. 1 is a system diagram of an example optical networking system in which one or more disclosed embodiments may be implemented.

FIG. 1 is a diagram of an example optical networking system 100 in which one or more disclosed embodiments may be implemented. The optical networking system 100 is a communication network using optical signals that encode digital information onto light in order to transmit vast amounts of data across network elements in the communication network. It may use fiber-optic cables, amplifiers, lasers, LEDs, and Wavelength Division Multiplexer (WDM) to transmit large quantities of data across the communication network.

As shown in FIG. 1, the optical networking system 100 may include light sources 102a, 102b, 102c, light sinks 104a, 104b, 104c, multiplexer modules 106, 112, demultiplexer modules 110, 114, and optical amplifiers 108a, 108b, 108c. 108d. Each of the light sources 102a, 102b, 102c may be any type of device configured to transmit light signals onto multiplexer modules 106, 112. The light signals originated from the light sources 102a, 102b, 102c may be from lasers or LEDs as examples. The light sources 102a, 102b, 102c are points where an optical layer or L0 layer may initiate in the optical networking system 100. In the light sources 102a, 102b, 102c, digital transport data may be modulated and/or mapped into optical channels for the multiplexer modules 106, 112. Similarly, each of the light sinks 104a, 104b, 104c may be any type of device configured to receive light signals from demultiplexer modules 110, 114. The light signals originated from the light sources 102a, 102b, 102c terminate at the light sinks 104a, 104b, 104c. In the light sinks 104a, 104b, 104c, a digital layer or L1 layer may initiate and optical signals may be demodulated and/or demapped into digital transport data for digital transport networks such as Synchronous Digital Hierarchy (SDH) or Synchronous Optical NETwork (SONET). The light sources 102a, 102b, 102c and the light sinks 104a, 104b, 104c may be provided as one or more light cards/modules.

Each of the multiplexer modules 106, 112 may be any type of device configured to select one of several input signals and forward the selected input signal into a single optical fiber. For example, the multiplexer modules 106, 112 may multiplex a number of optical carrier signals received from light sources 102a, 102b, 102c onto a single optical fiber by using different wavelengths of laser light. Similarly, each of the demultiplexer modules 110, 114 may be any type of device configured to take a single input line and select one of many output lines, which is connected to the single input. For example, the demultiplexer modules 110, 114 may demultiplex optical signals that are carried on a single optical fiber received from optical amplifiers 108b, 108d onto a number of optical carrier signals by using different wavelengths of laser light. The multiplexer modules 106, 112 and the demultiplexer module 110, 114 may be provided as one or more multiplexing/demultiplexing systems. The multiplexing/demultiplexing systems may include wavelength division multiplexing (WDM) systems, Coarse WDM (CWDM) systems, Dense WDM (DWDM) systems, Optical Add Drop Multiplexer (OADM), Reconfigurable Optical Add Drop Multiplexer (ROADM), Enhanced WDM (EWDM) systems, and the like.

Each of optical amplifiers 108a, 108b, 108c, 108d may be any type of device configured to amplifies an optical signal without the need to convert it to an electrical signal. The optical amplifiers 108a, 108b, 108c, 108d may include laser amplifiers, doped fiber amplifiers (DFAs), erbium doped fiber amplifiers (EDFAs), semiconductor optical amplifiers, Raman amplifiers, optical parametric amplifiers, and the like.

In the optical networking system 100, each of multiplexer modules 106, 112, demultiplexer modules 110, 114, and optical amplifiers 108a, 108b, 108c, 108d may form a network node or network element jointly or separately as redistribution points or communication endpoints. For example, a multiplexer module 106 and light sources 102a, 102b may form an add network element (ADD NE) 105 to distribute light signals originated from light sources 102a, 102b into the optical networking system 100. The add NE 105 may be located upstream in the optical network system 100. A demultiplexer module 110, multiplexer module 112, light sink 104a, and light source 102c may form an express network element (Express NE) 111 to redistribute the optical signals originated from the light sources 102a, 102b, 102c. A demultiplexer module 114 and light sinks 104b, 104c may form a drop network element (DROP NE) 115 as communication endpoints. The DROP NE 115 may be located downstream in the optical networking system 100. The optical signals demultiplexed by the demultiplexer module 114 may be provided to light sinks 104b, 104c where those signals are converted into client digital transport data.

The network elements (NEs) 105, 111, 115 may include one or more network cards such as light sources 102a, 102b, 102c, light sinks 104a, 104b, 104c, multiplexer modules 106, 112, demultiplexer modules 110, 114. For example, an ADD NE 105 may comprise light sources 102a, 102b and multiplexer module 106. An Express NE 111 may comprise a light sink 104a, light source 102c, demultiplexer module 110, and multiplexer module 112. The DROP NE 115 may comprise light sinks 104b, 104c and demultiplexer module 114. The NEs 105, 111, 115 may be network nodes, hops, or the like.

The NEs 105, 111, 115 with network cards may be connected to each other with an inter-card communication network 123 and an inter-NE communication network 124. The inter-card communication network 123 may involve card control communications between cards within NEs 105, 111, 115 by using link layer protocols such as Ethernet. The inter-NE communication network 124 may involve control data communications between NEs 105, 111, 115 generally through Optical Supervisory Channel (OSC) that is carried on the same fiber where optical signals that encode digital transport data (i.e. L0 data plane) is carried. The inter-card communication network 123 and inter-NE communication network 124 may also be connected to control domains of network elements. Such control domains may include source control domain 116 for light sources 102a, 102b, 102c, multiplexer control domains 118a, 118b for multiplexer modules 106, 112, and demultiplexer control domains 122a, 122b for demultiplexer modules 110, 114. Control domains may generate control domain/plane messages and transmit the control domain/plane messages with control data 120 to different network elements via the inter-card communication network 123 and inter-NE communication network 124. For example, light sources 102a, 102b, 102c or light sinks 104a, 104b, 104c may generate digital fault messages within its source control domain 116 when it detects an error in encoding or decoding digital frames. These digital fault messages may be transmitted to other network elements via the inter-card communication network 123 and inter-NE communication network 124.

Multiplexer/demultiplexer modules 106, 110, 112, 114 may include a Wavelength Selective Switch (WSS), WSS controller, Optical Power Monitoring (OPM) unit, and Optical Supervisory Channel (OSC) controller. Multiplexer modules 106, 112, and demultiplexer modules 110, 114 may also generate Optical Layer Defect Propagation (OLDP) messages using overhead frames mapped to an optical supervisory channel (OSC). For example, when there is a failure caused by fiber cuts in the upstream network, the multiplexer modules 106, 112 may generate a forward defect indication (FDI) message within the multiplex control domain 118a, 118b and transmit the FDI message to demultiplexer modules 110, 114 in the downstream network via the inter-card and inter-NE communication network 124. In another example, when demultiplexer modules 110, 114 detects the power of optical channels is too low, the demultiplexer modules 110, 114 may generate an optical power received (OPR) status messages within its demultiplexer control domain 122a, 122b and transmit the OPR status messages to the downstream network via the inter-card and inter-NE communication network 124. The OPR status messages may also be used locally within a NE.

An OLDP may be a fault propagation mechanism in the optical layer for Operations Administration Maintenance (OAM) considerations and to facilitate protection or restoration using the overhead frames mapped to an OSC. The OAM may be a standardized terminology in transport networks used to monitor and manage the network. The OSC may refer to an additional wavelength that is usually outside of the amplification band (e.g. at 1510 nm, 1620 nm, 1310 nm or another proprietary wavelength). The OSC may carry information about multi-wavelength optical signals as well as remote conditions at the optical add/drop or OA sites. The OSC may be used for OAM in DWDM networks. The OSC may be the multi-wavelength analogue to SONET's DCC (or supervisory channel).

As described above, control data 120 may include various types of control messages for the purpose of network management across various domains. It may include power control domain messages, protection domain massages, routing domain messages, and the like. The control data 120 may originate from domains such as source control domain 116, multiplexer control domains 118a, 118b, demultiplexer control domains 122a, 122b, and the like. The control data 120 in band control domain may reflect the state of the domain and may be carried across the domains in a synchronized fashion. The control data 120 may be carried from a control domain to another control domain via an in-band or out-of-band communication channel such as OSC. Alternately, the control data 120 may be carried between domains through a centralized controller that has network topology information on it.

In an embodiment, optical channel protection schemes may be implemented on lines similar to channel protection schemes in a digital layer. For example, working and protecting paths may be monitored independently for faults. Specifically, when faults are detected on a working path or a protecting path, an Automatic Protection Switching (APS) engine may select a healthier path among the working and protecting paths based on a protection switching decision. The APS engine may be a main brain behind the protection switching decision to select a healthier path among the working or protecting paths. The APS engine, at any time, may monitor both working and protecting paths for fault status. If a fault status is detected, it is fed into the APS engine for the protection switching decision. Based on this mechanism, the APS engine may select an optical channel that is fault free among working and protecting paths. Apart from this fault status report, a network operator or user may initiate commands such as lock-out, manual switch, forced switch, and the like. The APS engine may consider these commands together with fault conditions on optical channels when it determines priority of the path selection.

Figure 2:
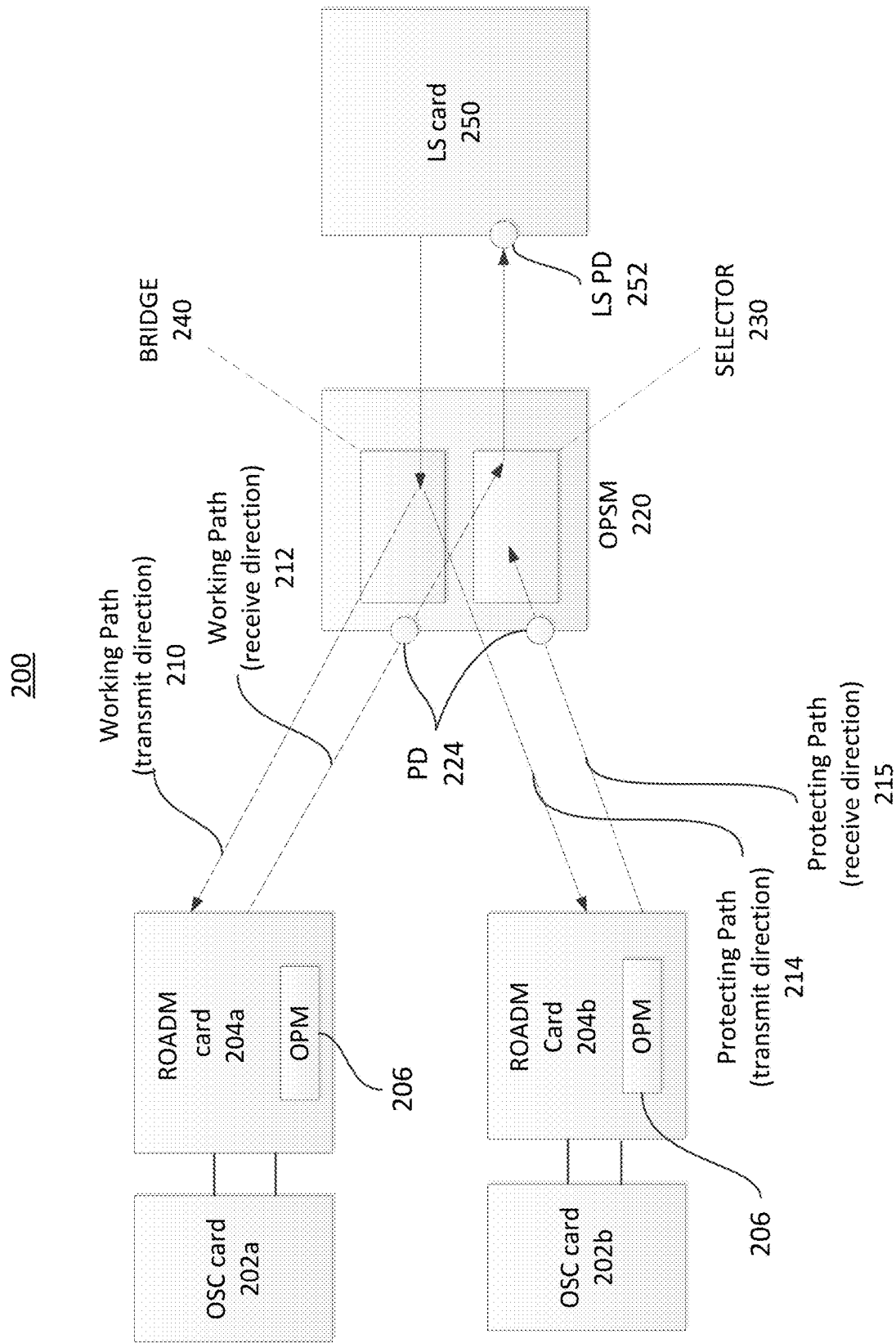
FIG. 2 is a system diagram of an example optical channel protection system that may be used within the optical networking system illustrated in FIG. 1.

FIG. 2 is a diagram of an example optical channel protection system 200 that may be used within the optical networking system 100 in FIG. 1. The optical channel protection system may include Optical Supervisory Channel (OSC) cards 202a, 202b, Reconfigurable Optical Add Drop Multiplexer (ROADM) cards 204a, 204b, an Optical Protection Switching Module (OPSM) 220, and a Light Source (LS) card 250.

In the LS card 250, digital transport client data, such as Optical Transport Network (OTN) or Optical Data Unit (ODU) frames may be mapped to a super-channel or optical channel and broadcasted via the OPSM 220 to the two ROADM cards 204a, 204b. Similarly, in the case of digital clients, such as SDH or SONET, the respective encapsulating frames may be mapped to a super-channel or optical channel and broadcasted via the OPSM 220 to the two ROADM cards 204a, 204b. In an embodiment, the LS card 250 may include one or more photo diode LS PD 252 to measure power level of the received optical signals on it.

The super-channel as used herein means a group of multiple optical carriers (e.g. multiple optical channels or multiple optical wavelengths) that are combined to create a unified channel of a higher data rate using wavelength division multiplexing (WDM). A difference between a super-channel and a WDM signal is the channel gap. With a super-channel, the channel gap between the optical channels is reduced relative to a WDM signal. This means that the multiple optical carriers in a super-channel are more tightly packed than those in a WDM signal. Such a channel gap may be achieved with techniques such as orthogonal-band-multiplexed (OBM)-orthogonal frequency division multiplexing (OFDM), no guard interval (NGI)-OFDM, Nyquist WDM, multi-channel equalization (MCE)-WDM, or the like. Moreover, the multiple optical carriers in a super-channel are sufficiently spaced not to cause interference among the optical carriers. For example, multiple optical carriers combined by dense wavelength division multiplexing (DWDM) may be spaced less than 1 nanometer.

The super-channel may be provisioned in an Optical Transport Network (OTN) as a single grouped entity for routing and signaling purpose. Specifically, the multiple optical carriers within a super-channel are routed together through the OTN and managed as though it included only one optical channel. The super-channel may be sourced from a sing light source at the LS card 250. The LS card 250 may be a single line card, a single chip, a single photonic integrated circuit (PIC) or the like that generates one or more super-channels. When multiple super-channels are generated from light sources 102a, 102b, 102c, multiplexer modules 106, 112 may combine the multiple input super-channels to transmit over an output fiber. Demultiplexer modules 110, 114 may separate the multiple super-channels and provide each super-channel to light sinks 104a, 104b, 104c.

Paths between the OPSM 220 and the ROADM cards 204a may comprise working paths: a working path for a transmit direction 210; and a working path for a receive direction 212. Similarly, paths between the OPSM 220 and the ROADM card 204b may comprise protecting paths: a protecting path for a transmit direction 214; and a protecting path for a receive direction 215. The working 210, 212 and protecting 214, 215 paths may carry one or more super-channel end to end. For example, the LS card 250 may transmit a super-channel to the OPSM 220 where a bridge 240 simultaneously transmits the super-channel onto the working path 210 and protecting path 214. When the OPSM 220 receives the super-channel from the ROADM cards 204a, 204b, the OPSM 220 may receive it from one of the working path 212 and the protecting path 215. The selector 230 may select which of the two incoming traffic the selector 230 is going to pick among the working path 212 and the protecting path 215. In FIG. 2, the selector chose the working path 212 to receive the super-channel transmitted from the ROAMD card 204a. If the selector chooses a working path 212 to provide the super-channel to the LS card 250, the working path 212 may become an active path. The unselected protecting path 215 may become a standby path. If the OPSM 220 detects a fault condition on the working path 212 and commands the selector 230 a switching decision, the selector 230 may connect the protecting path 215 to the LS card 250 and disconnect the working path 212 from the LS card 250. In this case, the protecting path 215 may become an active path and the working path 212 may become a standby path.

ROADM cards 204a, 204b may be used for multiplexing/de-multiplexing a large number of optical channels to/from a band that achieves a wavelength multiplexing in an optical layer (i.e. L0 layer). Generally, the ITU-T G.709 compliant OMS section may be formed at the ROADM cards 204a, 204b. The ROADM cards 204a, 204b may be associated with OSC cards 202a, 202b respectively where supervisory channels are added in the transmit direction or tapped in the receive direction. Generally, the ITU-T G.709 compliant OTS section may be formed at the OSC cards 202a, 202b. Here, the OSC card 202a and the ROADM card 204a are shown as different cards, but they may be equipped within a single card or a single WDM system. Similarly, the OSC card 202b and the ROADM card 204b are shown here as different cards, but they may be equipped within a single card or a single WDM system.

In the receive direction, a selector 230 in an OPSM card 220 may receive a command from a switching controller and select one of the optical channels from the working path 212 or protecting path 215. The selector 230 may also drop the selected path to the LS card 250. In an embodiment, the switching controller may reside in the OPSM card 220 or in other cards such as ROADM cards 204a, 204b.

In order to meet a sub-50 ms traffic recovery time, when a fault occurs inside or outside of the optical channel protection system 200, the switching controller may need to be notified about the fault as quickly as possible. In digital layers, a Field Programmable Gate Array (FPGA) or similar hardware monitors faults. As a result, fault triggering is fast enough to meet the sub 50 ms traffic recovery time. For example, in case of ODU protection, OTU/ODU faults are monitored by an OTN mapping device and the digital APS engine may be notified of fault conditions quickly. Thus, sub-50 ms traffic recovery may be easily achieved with the FPGA or similar hardware.

In case of optical layers, an Optical Power Monitoring (OPM) device 206 may monitor health of an optical channel. Specifically, the OPM device 206 may monitor power levels for a range of spectrum in optical channels or super-channels. However, due to physical limitations of the OPM device 206 design, the OPM device 206 usually takes an order of seconds, for example, three to ten seconds, to measure the power levels. Secondly, an OPM device 206 may be expensive. As a result, it may not be practical for network operators to dedicate the OPM device 206 solely for power monitoring purposes where optical channel protection is required. In other words, it may not be desirable to exclusively use the OPM device 206 for monitoring optical channels. In general, the OPM devices 206 may be placed in ROADM cards 204a, 204b where multiple optical channels are multiplexed to form a complete C/L-band and where optical power controls are performed for each of the optical channels. Thus, for network operators, placing OPM devices 206 in ROADM cards 204a, 204b is a more cost efficient method from an overall design point of view.

Furthermore, in case of a soft failure situation where the OPM device 206 detects that some part of C band has lower power level than a threshold value, but the rest of C band has higher power level than the threshold value, optical power detection by the OPM device 206 may not be used to conclude that end digital traffic in a LS card 250 is down because the LS card 250 may still detect the rest of C band landed on the LS card 250 has no error. For example, the OPM device 206 may detect that some of the super-channel have a power less than a threshold value, thereby concluding that the optical channel is down. However, if the rest of the super-channel has a power greater than the threshold value, the digital client data extracted from the rest of the super-channels may still be error-free. Thus, such a threshold based rule in the OPM device 206 based on expected power should not be applied because, although the threshold based rule concludes that the optical channel is down, it is possible that the digital traffic landed on the LS card 250 may still be extracted error-free. In case of a hard failure situation where the OPM device 206 detects a complete loss of light condition in the power measured for an optical channel, the OPM device 206 may conclude that the optical channel is down.

Photo Diodes (PDs) 224 may be used to monitor the health of working paths 210, 212 and protecting paths 214, 215 and the switching controller may use the result to trigger a switching decision. A PD 224 is a device that may measure power levels in a complete band of the optical spectrum. As shown in FIG. 2, the PDs 204 may be located on ports of the OPSM 220 where the OPSM 220 receives the working path 212 and the protecting path 215. Because the PDs 224 may monitor and detect power changes quickly, the switching controller may be quickly notified to act when an optical channel suffers a failure. Thus, using PDs 224 in the optical channel protection system 200, sub-50 ms traffic recovery may be achieved.

In an embodiment, ROADM cards 204a, 204b may be equipped with sophisticated drop-side filters that may filter out an optical channel from a complete band. When the optical channel suffers a fault condition, the PDs 224 may detect an Optical Loss Of Signal (OLOS) condition. However, in another embodiment where ROADM cards 204a, 204b do not have the drop-side filters, the ROADM cards 204a, 204b may not filter out an optical channel from a complete band. In this case, the filtering may eventually be done in the LS card 250. In such a deployment, the PDs 224 may not detect an OLOS on the optical channel, and therefore the switching controller may not trigger a switching decision even though the optical channel is dead. Specifically, if the ROADM cards 204a, 204b are not equipped with the drop-side filters, multiple super-channels may be dropped on the PDs 224 of the OPSM 220. If a single super-channel out of the multiple super-channels is dead, but the rest of the super-channels are not dead, the PD 224 may not detect an OLOS condition because it can only detect the OLOS condition when all the super-channels are dead. Thus, a switching decision based on an OLOS condition detected by the PDs 224 may be used in cases where there is a failure on the complete band. When the band carries multiple optical channels and some optical channels are up while other optical channels that require optical protection are dead, the PD 224 may not reflect the OLOS condition. Thus, the switching controller may not trigger its switching decision even though there is a failure on the optical channels. In such cases, optical protection may not be achieved by monitoring the PDs 224 on the working 212 and protecting 215 paths. This means that although PD-based monitoring may help in achieving fast fault triggers for optical protection, not all network level faults reflect the OLOS on the OPSM card.

In another embodiment, Optical Layer Defect Propagation (OLDP) faults may be used to trigger faults for the optical channel protection in an L0 layer. For example, the switching controller may receive OLDP fault messages, such as a Forward Defect Indication Payload (FDI-P) and Open Connection Indication (OCI) from OSC cards 202a, 202*b* in the form of overhead monitoring bytes, and trigger a switching decision based on the OLDP fault messages. However, since the overhead monitoring bytes carried through an Optical Supervisory channel (OSC) are tapped at each network element in the optical network and propagated in the downstream via the OSC, it may take some time for the OLDP faults to surface at the DROP NE where an optical channel protection system 200 runs to trigger a switching decision by the switching controller. Thus, the switching controller may use the OLDP faults, but the sub 50 ms traffic recovery may not be guaranteed due to network latency issues. In an embodiment, OLDP fault propagation may be done by Field Programmable Gate Array (FPGS) or Application Specific Integrated Circuit (ASIC) in the upstream network elements. However, this may increase the cost of the network equipment prohibitively and, hence, may not be a practical deployment.

Furthermore, OLDP fault propagation may not indicate a last hop degradation problem. For example, after the last Express NE 111 in FIG. 1, network elements, such as OAs 108*c*, 108*d*, might not include OPM devices to monitor a fault on super-channel level or control at the super-channel level. Thus, an OSC may carry super-channel faults injected up to the Express NE 111, but might not carry super-channel faults caused after the Express NE 111. If there is any degradation on the super-channel caused after the Express NE 111, such degradation may not be reflected in the super-channel fault status carried in the OSC/OLDP.

Thus, any subsequent degradation suffered by the optical channel after the Express NE 111 may not trigger an OLDP fault. For example, OAs 108*c*, 108*d* in the downstream may not detect the power of super-channels because they do not include OPM devices. Hence, OLDP faults propagation may not address the last hop degradation problem.

Figure 3:
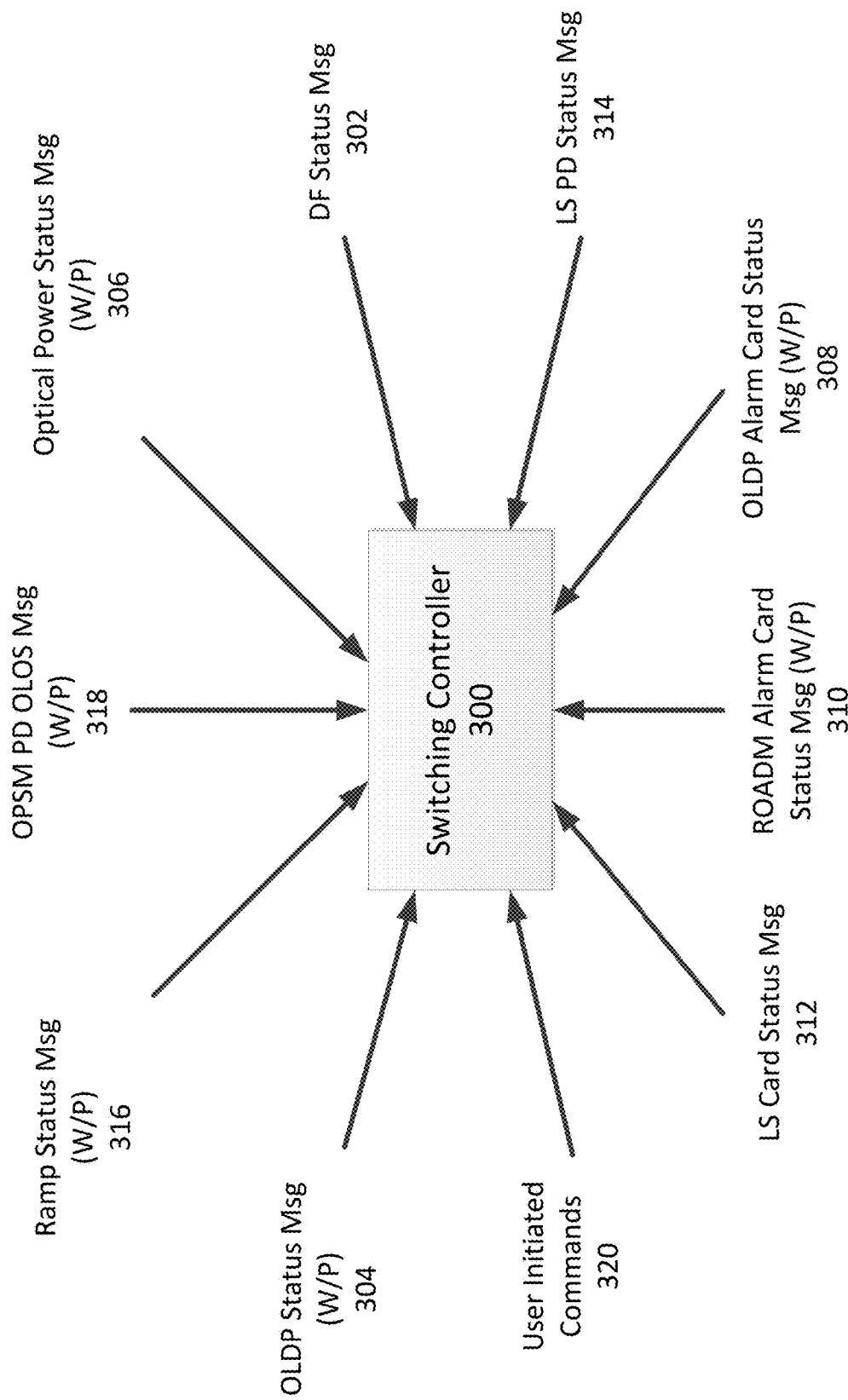
FIG. 3 is a diagram of an example switching controller that may be used within the optical channel protection system illustrated in FIG. 2.

FIG. 3 is a diagram of an example switching controller 300 that may be used within the optical channel protection system 200 in FIG. 2. The switching controller 300 may comprise a processor, a memory, a bridge, and a selector. The processor may be configured to run APS engine in the switching controller 300. The switching controller 300 may be located in the OPSM 220, ROADM cards 204*a*, 204*b*, OSC cards 202*a*, 202*b*, LS card 250, and the like. The switching controller 300 may also be located separately or independently in the optical channel protection system 200. The switching controller 300 may reside in a centralized controller or a network management entity in the north bound layer.

To improve slow fault trigger and reliability issues in an OPM based monitoring scheme, a PD based monitoring scheme, and an OLDP fault propagation scheme described above, the switching controller 300 may harnesses digital layer fault triggers from a LS card 250 with the OPM based monitoring scheme, a PD based monitoring scheme, and an OLDP fault propagation scheme.

However, since the digital faults may be monitored after the selector for the selected path, the switching controller 300 may use non-reliable slow fault triggers, such as the OPM based scheme and OLDP propagation scheme, in conjunction with the fast digital layer faults triggers. This means that the switching controller 300 may need to handle the slow fault triggers that are dedicated, but non-reliable, and the fast fault triggers that are non-dedicated, but reliable, for working and protecting paths. In addition, since the low cost photo-diode power monitoring may also help to detect faster faults in certain scenarios, that monitoring result may be fed into the switching controller 300 as an input. Feeding the digital faults to the switching controller 300 may not be sufficient because the digital fault reflects failure on one of the working or protecting path based on which path the selector is switched to. This means that the switching controller 300 may be dependent on the selector's status while evaluating digital triggers. Thus, to take proper decisions, other fault conditions that may cause slow and non-reliable switching triggers may also be fed to the switching controller 300.

Furthermore, since fault triggers are sourced from different cards through control plane messaging, the switching controller 300 may take into account whether the control plane connectivity of the cards is up or not for an alarm condition to qualify as valid or stale. For example, for OLDP faults, loss of OSC or control plane connectivity in the upstream network elements may mean that the OLDP faults on the DROP NE is stale and therefore may not be trusted. Thus, safe decisions may need to be made in such cases. Similarly, fault conditions caused by ROADM cards 204*a*, 204*b* due to a low level of power in the OPM 206 may not act a switch triggers because they may not reflect hard fault conditions that necessarily bring down the end traffic. However, the switching controller 300 may still use the fault conditions to make safe decisions with respect to wait to restore (WTR) timer.

As described above, there may be many source conditions that the switching controller 300 needs to consider at any time to make safe decisions. Each of the fault conditions may require a different handling with respect to other fault conditions. Thus, decision making by the switching controller 300 may not be deterministic. For example, based on whether fault conditions are stale or not, or whether the fault conditions serve as a reliable trigger or not, the switching controller 300 may deduce whether an optical channel is necessarily down or up. Thus, the switching controller 300 may make safe or best decisions so that the traffic is kept up on a best efforts basis. Thus, to some extent, the switching controller 300 that runs an APS engine is heuristic and constraint driven based on fault conditions and card status. Although these characteristics may make the switching controller 300 more complex, they may help reduce the cost of implementing the optical channel protection system 200.

Referring to FIG. 3, the switching controller 300 may receive a digital fault (DF) status message 302 from an LS card 250. The DF fault status message 302 may indicate whether a digital frame demodulated from an optical signal includes a fault. For example, the DF fault status message 302 indicates whether client digital data demodulated from optical data received from a working path 212 or a protecting path 215 is failure free. Here, the optical signal may include a super-channel that is received from the working path 212 or the protecting path 215. The super-channel may indicate a group of multiple wavelengths that originated from the LS card 250. The group may include a single wavelength or multiple wavelengths to create a unified channel of higher data rate.

The switching controller 300 may further receive Optical Layer Defect Propagation (OLDP) status messages 304 for the working path 212 and the protecting path 215 from OSC cards 202*a*, 202*b*. The OLDP status messages 304 may indicate an OSC status of the super-channel on the working path 212 or the protecting path 215. The switching controller 300 may receive optical power status messages 306 for the working path 212 or the protecting path 215 from ROADM cards 204*a*, 204*b*. The optical power status messages 306 may indicate measured power levels of the super-channels on the working path 212 or the protecting path 215. The measured power level in the super-channels may be measured by OPM devices 206. The optical power status messages 306 may include an Optical Power Received (OPR) low alarm status and an OPR unreliable alarm status. The OPR low alarm status may indicate that the measured super-channel power is below a certain threshold, such as a drop launch target power. For example, if the measured super-channel power is 9 dBm or more below the drop launch target power, the ROADM cards 204a, 204b may generate the optical power status message 306 indicating the OPR low alarm status. The OPR unreliable alarm status may indicate the measured super-channel power is below an OPM reliability threshold, for example, −20 dBm per slice.

The switching controller 300 may further receive card status messages that indicate whether or not control plane connectivity between the switching controller 300 and other cards is stale. Specifically, the switching controller 300 may receive OLDP alarm card status messages 308 for the working path 212 and the protecting path 215, ROADM alarm card status messages 310 for the working path 212 and the protecting path 215, and a light source card status message 312. The OLDP alarm card status messages 308 may be received from OSC cards 202a, 202b and may indicate the control plane connectivity between the OSC cards 202a, 202b and the switching controller 300. The ROADM alarm card status messages 310 may be received from ROADM cards 204a, 204b and may indicate the control plane connectivity between the ROADM cards 204a, 204b and the switching controller 300. The light source card status message 312 may be received from the LS card 250 and may indicate the control plane connectivity between the LS card 250 and the switching controller 300.

The switching controller 300 may receive a Light Source Photo Diode (LS PD) status message 314 that indicates whether there exists an Optical Loss of Signal (OLOS) condition at the LS card 250 in a direction where the LS card 250 receives the optical signal from the working path 212 or the protecting path 215. The LS card 250 may include one or more photo diodes LS PD 252 to measure power levels of the received optical signals on it. Moreover, the switching controller 300 may receive ramp status messages 316 for the working path 212 and the protecting path 215 from the ROADM cards 204a, 204b. The ramp status messages 316 may indicate a ramp process status of the super-channel in a de-multiplexing direction of the ROAMD cards 204a, 204b. Specifically, the ramp process status may represent whether a ramp process in the ROADM cards 204a, 204b is completed or in progress.

The ramp process of the super channel in the de-multiplexing direction may indicate a power control process in the ROADM cards 204a, 204b by adjusting an attenuation level on a wavelength selective switch (WSS) device of the ROADM cards 204a, 204b to meet a transmit power on the tributary port to a predetermined target launch power of the super-channel in the ROADM cards 204a, 204b. Specifically, a WSS device in a multiplexing or de-multiplexing direction in the ROADM cards 204, 204b may be controlled by an automatic control loop mechanism to account for losses, equipment aging and change of power at optical signals source form the LS card 250. The ramp process may involve associating a tributary input port of the WSS device with a line port or vice-versa so that light can flow from the input port to the line port in the multiplexing direction or the line port to the tributary port in the de-multiplexing direction, respectively. The ramp process may also involve setting the attenuation in the WSS device step-wise, in a phased manner, to gradually launch the optimal power value out of the egress port and shaping up the power spectrum of the super-channel by fine-tuning the spectral slices of the WSS device. Until such a process is complete, the optical data path may not be deemed to be up and the traffic path for the optical data may not be healthy enough to be considered for the optical channel protection or restoration. The WSS device may be a component that is used in optical communications networks to route or switch optical signals between optical fibers on a per-slice basis. Generally, the WSS device may control power levels by specifying an attenuation level on a pass-band. The WSS may be programmable for source and destination fiber ports and associated attenuation may be specified for a pass-band.

The switching controller 300 may receive an Optical Loss of Signal (OLOS) message 318 on a band spectrum in the working path 212 or protecting path 215. The OLOS message 318 may be received from PDs 224 in the OPSM 220. The PDs 224 may monitor power levels of the complete band signal received from the working path 212 and the protecting path 215 and report the measurement to the switching controller 300 via control plane messages. Additionally, the switching controller 300 may receive user initiated commands 320 such as lock-out, manual switch, and forced switch from a network operator or a user. The network operator or user may send the user initiated commands 320 through a network management entity in a north bound layer.

Upon receiving the messages described above, the switching controller 300 may make a safe or best decision whether to switch a current active path to a standby path. Specifically, the switching controller 300 may determine the working path 212 as an active path and the protecting path 215 as a standby path, or the protecting path 215 as an active path and the working path 212 as a standby path, based on the DF status message 302, OLDP status messages 304, optical power status messages 306, OLDP alarm card status messages 308, ROADM alarm card status messages 310, a light source card status message 312, a LS PD status message 314, ramp status messages 316, an OLOS message 318, user initiated commands 320, and the like.

For example, in an embodiment, if the switching controller 300 receives an optical power status message 306 from a ROADM card 204a indicating an OPR low of the super-channel in the working path 212, but does not receive a message indicating status of the super-channel in the protecting path 215, such as OLDP status message 304, a second optical power status messages 306 from a ROADM card 204b, and a DF status message 302, then the switching controller 300 may determine the working path 212 as the active path and the protecting path 215 as the standby path. If the switching controller 300 receives at least one of an OLOS message 318, an OLDP status message 304, or the DF status message 302 for the working path 212 and an optical power status messages 306 from a ROADM card 204b indicating an OPR low of the super-channel in the protecting path 215, then the switching controller 300 may determine the working path 212 as the standby path and the protecting path 215 as the active path. The reason for taking such decisions may be due, for example, to the fact that the client digital traffic might still be up if an OPR low alarm is present.

In another embodiment, if the switching controller 300 receives an optical power status messages 306 from a ROADM card 204a indicating an OPR unreliable of the super-channel in the working path 212, the switching controller 300 may determine the working path 212 as a standby path and the protecting path 215 as an active path. This is because in case of the OPR being unreliable, the digital traffic would mostly be down. If the switching controller 300 receives at least one of an OLOS message 318, an OLDP status message 304 from an OSC card 202*a*, or a DF status message 302 for the working path 212, and an optical power status messages 306 from a ROADM card 204*b* indicating an unreliable OPR of the super-channel in the protecting path 212, then the switching controller 300 may determine the working path 212 as a standby path and the protecting path 215 as an active path. Such decisions may be made in systems where OPR alarms are not updated frequently through OPM measurements and this may take an order of minutes for the alarm to be updated. In scenarios described above, a sole OPR alarm may be considered as stale and thus, a best effort decision may be made since the other path is already down.

In another embodiment, if the switching controller 300 has a working path as an active path and receives an OLDP status message with FDI-O condition for the working path 212 from an OSC card 202*a*, but does not receive an OLOS message and the digital fault for the working path 212, the switching controller 300 may not initiate switching paths. That means, the switching controller 300 may still determine the working path 212 as an active path and the protecting path 215 as a standby path.

In another embodiment, if a working path 212 is determined as a standby path due to a DF status message 302 and thereby, a protecting path 215 is determined as an active path, then the switching controller 300 may determine the status of working path 212 as an intermediate state. After the switching controller 300 receives at least one of an OLDP status message from an OSC card 202*a* or an optical power status message 306 from a ROADM card 204*a*, then the switching controller 300 may clear the intermediate state of the working path 212. After the switching controller 300 determine the working path 212 as a standby path and the protecting path as an active path due to the DF status message 302 for the working path 212, the switching controller may determine the working path 212 as an active path and the protecting path 220 as a standby path if the protecting path has an optical power status message 306 from a ROADM card 204*b* and an OLDP status message 304 from an OSC card 202*b*. After the switching controller 300 determines the working path 212 as a standby path and the protecting path 215 as an active path due to the DF status message 302 for the working path 212, the switching controller 300 may determine the working path 212 as an active path and the protecting path 214 as a standby path if the switching controller 300 does not receive a DF status message 302 indicating digital fault status clearance within a predetermined time.

Figure 4:
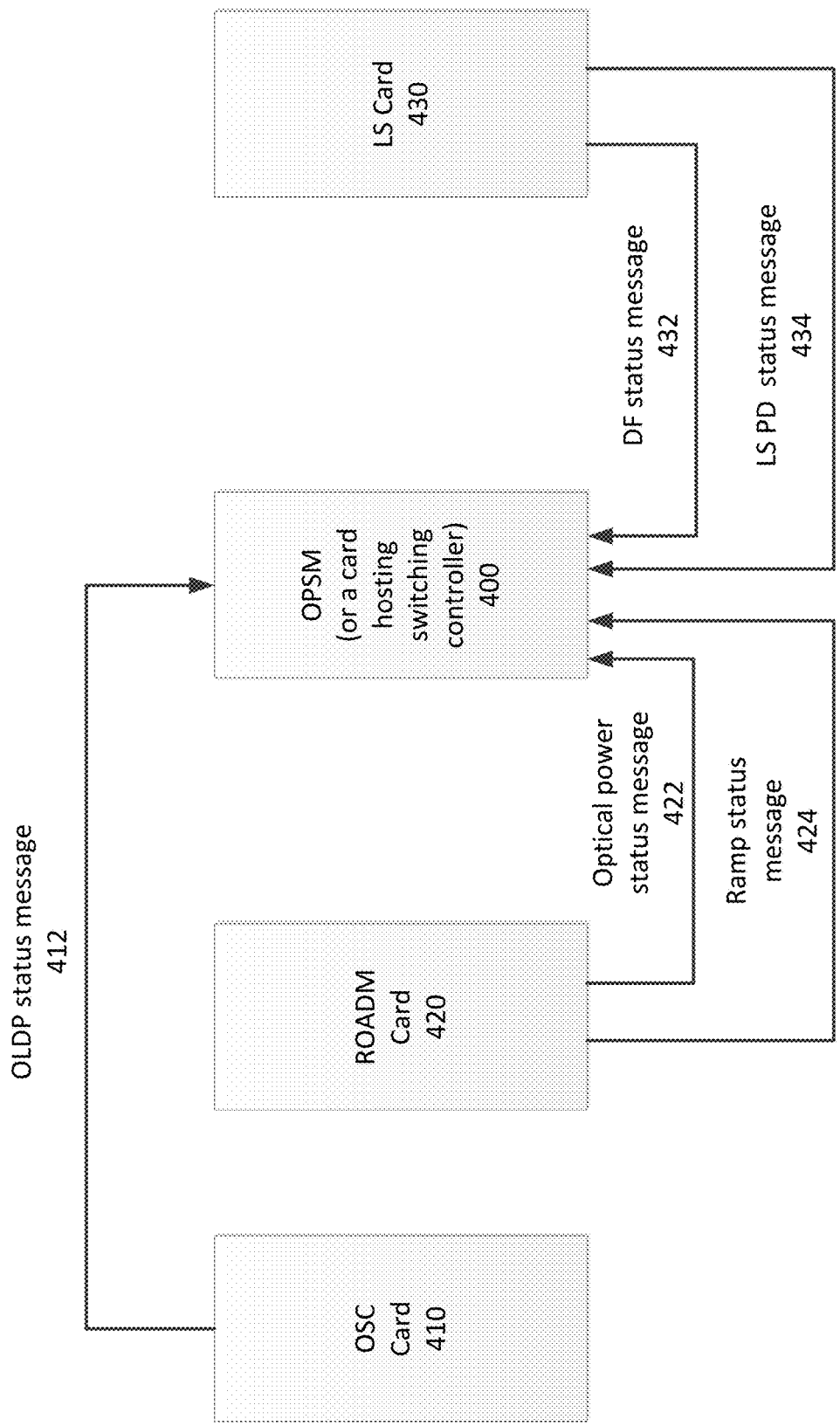
FIG. 4 is a block diagram illustrating an inter-card message flow to the switching controller illustrated in FIG. 3.

FIG. 4 is a diagram illustrating an inter-card message flow to a card hosting the switching controller 300 in FIG. 3. An optical protection switch module (OPSM) may be a card hosting switching controller 300. The OPSM may include a bridge 240 and selector 230 that operates at the band level. The OPSM may provide a super-channel protection by controlling the bridge 240 and selector 230 at the band level. In an embodiment, the OPSM may also include an APS engine to control the bridge 240 and selector 230. The OPSM may not bridge or switch one or some super-channels in the complete band.

As shown in FIG. 4, the OPSM 400 may receive OLDP status messages 412, optical power status messages 422, ramp status messages 424, DF status messages 432, and LS PD status messages 434 via an inter-card communication network. The OLDP status messages 412 may be received from an OSC card 410. The optical power status messages 422 and the ramp status messages 424 may be received from a ROADM card 420. The DF status messages 432 and the LS PD status messages 434 may be received from a light source (LS) card 430. The OPSM 400 may be connected to each card (i.e. OSC card 410, ROADM card 420, and LS card 430) with the inter-card communication network. The inter-card communication network may be connected to north bound interfaces for user initiated commands such as lock-out, manual switch, forced switch, or the like.

The optical power status message 422 from the ROADM card 420 may include two types of conditions: (1) super-channel optical power received low (SCH OPR LOW); and (2) SCH OPR UNRELIABLE. The SCH OPR LOW condition may be determined based on an OPM scan in the de-multiplexing direction performed by the ROADM card 420. This condition may be evaluated periodically, for example every 5 min, by the ROADM card 420 so as not to hog the card software with respect to the OPM usage. By evaluating the condition periodically, the ROADM card 420 may save the life of multiplexing/de-multiplexing switch. It is because one OPM device may be used to monitor both multiplexing and de-multiplexing direction slice powers, thereby reserving the OPM device to monitor each direction dedicatedly may cost too much. A switching controller in the OPSM 400 may consider that SCH OPR LOW may be stale at any point of time when this alarm condition is evaluated over a long period of time. In some embodiments, the switching controller may request an on-demand re-evaluation of this condition, for example, during a situation of reversion but not during a situation of failure that requires a fast switching for sub 50 ms traffic recovery. Having this SCH OPR LOW condition on a path may not necessarily indicate that the traffic may not go through that path. It may be still possible that client digital traffic on that path is alive even though this alarm is present.

The SCH OPR LOW alarm condition may be needed for the following reasons. First, the last hop degradation of the super-channel that may not be captured by the OLDP may be covered by the SCH OPR LOW alarm at the ROADM card 420. Second, the switching controller may make safer decisions with respect to reversion of traffics. For example, if a SCH OPR LOW is appeared on a work path, this may raise some doubt that reversion may necessarily bring up the traffic on the work path. Thus, it may be safer that the traffic still be on the failure free protect path when this alarm has appeared on the work path. Before reversion, the switching controller may send an on-demand request to the ROADM card 420 to re-evaluate this alarm condition on the work path. A completely failure free work path may trigger a decision to switch back to the work path. Third, after switching from an active path to a standby path due to digital fault condition such as loss of frame and loss of multi-frame (LOFLOM), the SCH OPR LOW alarm condition may be needed to re-evaluate whether the previous path (i.e. former active path) has an actual failure presented and the LOFLOM was not due to a temporary glitch. An on-demand request may be done to the ROADM card. OLDP fault propagation may be delayed or may not come due to some card rebooting on the upstream.

In an embodiment, a sole presence of an SCH OPR LOW condition with absence of other fault conditions such as PD OLOS, DF, and OLDP may not trigger a switch to the other path. The motivation here may be that the traffic may not be necessarily down with the sole SCH OPR LOW condition and waiting for other fault conditions may make sure that the path is concretely down.

After a wait to restore (WTR) timer expired but before reverting back to the working path, the OPSM 400 may request the ROADM card 420 to re-evaluate this SCH OPR LOW alarm condition. When this alarm condition comes on the working path, the OPSM 400 may determine not to switch back to the working path. The motivation here may be that the traffic may not be recovered possibly due to the last hop degradation or actual upstream failure that OLDP might have indicated on the working path yet not came due to the communication loss, high latency, or similar reason. Thus, it may be better for the OPSM 400 to determine to stay on the still 'good' protecting path rather than switching back to the 'doubtful' working path.

In another embodiment, even though the standby path has an SCH OPR LOW condition on it, if the current active path has a hard failure condition such as PD OLOS, DF, OLDP fault (i.e. other faults are absent and the SCH OPR LOW is the sole fault), the OPSM 400 may still initiate switching to the standby path because the current path (i.e. active path) is going down anyway. The motivation here may be that because the current path is going down anyway, the OPSM 400 may need to try switching to the other path, although the traffic may or may not be recovered. Moreover, the SCH OPR LOW condition on the other path may be stale, thereby requiring the OPSM 400 to ignore such a condition.

The whole motivation for the embodiments described above is to take safer decisions to the best possible extent. Because the OLDP status message 412 and optical power status message 422 including the SCH OPR LOW conditions may not be appeared instantly and a digital fault monitoring by the LS card 430 may not be dedicated on both working and protecting paths, there may be a fast real-time monitoring at super-channel level, for example a digital fault on the LS card 430, on one of the paths to which the selector is switched to.

As described above, the optical power status message 422 from the ROADM card 420 may include a SCH OPR UNRELIABLE condition. The SCH OPR UNRELIABLE condition may be determined based on an OPM scan in the de-multiplexing direction performed by the ROADM card 420. If the measured power of the super-channel is below an OPM reliability threshold, for example −20 dBm per slice, then this SCH OPR UNRELIABLE alarm may be raised on the super-channel. This alarm may be a direct trigger to the switching controller indicating that the super-channel is necessarily down and therefore, unlike the SCH OPR LOW alarm, the switching controller needs to trigger switching the path.

In an embodiment, upon receiving the SCH OPR UNRELIABLE alarm, the switching controller may initiate a switch trigger because this alarm condition is a hard failure rather than a soft failure like the SCH OPR LOW condition.

In another embodiment, when the switching controller receives a certain condition on the current active path that requires switching to the standby path but the standby has the SCH OPR UNRELIABLE alarm condition, the switching controller may still initiate switching to the standby path. It is because this SCH OPR UNRELIABLE alarm on the standby path may be stale and therefore, there is no harm in initiating the switch to the standby path since the active path is already down.

In yet another embodiment, in order to facilitate faster protection switch triggers, based on a heuristic software configurable threshold, T=Function (Total SCHs in the received band), a receive band PD monitoring performed by a DSP in a hardware may trigger an interrupt reflecting a potential problem with some SCH when the DSP monitors a T dBm clip in its received power. This may reflect either one or more super-channels have died in the band or some high span loss has happened in the upstream. Based on this interruption, a high priority application thread may trigger an OPM scan and therefore may deduce if there is an SCH that has a SCH OPR LOW or SCH OPR UNRELIABLE condition. In this case, the trigger of OPM scan in a demultiplexing direction may be initiated by the hardware. Thus, the fault trigging may be fast and may help the switching controller know the alarm condition on the super-channel as soon as possible. However, because the OPM scan may take 3-10 seconds, deducing the SCH OPR LOW or SCH OPR UNRELIABLE condition by the OPM may be slow, but other conditions from the LS card 430 are almost immediate. In deployments with alien light sources, where the LS card 430 may be a 3rd party light source card, since the fast digital trigger is absent from the LS card 430 and hence the trigger conditions are mostly driven by reception of OLDP faults that can take some time in longer links, such a mechanism may help in achieving a faster response time.

As described above, the OPSM 400 may receive OLDP status messages 412 from an OSC card 410 via an inter-card communication network. The OLDP status message 412 may include a super-channel forward defect indication-overhead (SCH FDI-O) or optical multiple section-overhead (OMS) FDI-O conditions. These conditions on the super-channel may indicate that there is some problem in the upstream such as loss of control plane connectivity or OSC loss because other co-existing OLDP conditions may not be trusted.

In an embodiment, when the switching controller only receives an OLDP failure condition without other conditions on the active path, the switching controller may not initiate a trigger to switch from the active path to the standby path. For example, without PD OLOS, SCH OPR LOW, and DF conditions that could have caused the triggers to switch, the switching controller may not trigger the switching when FDI-O is present alone on the active path. The motivation here may be that OLDP is giving failure indication solely but it may not be reliable, for example because of a loss of control plane or loss of OSC.

In another embodiment, a reversion may not be triggered to the working path when the working path has an OLDP clearance condition (e.g. no FDI-P or OCI condition) but FDI-O is present. The motivation here may be that there may be an OLDP failure present but it may not be reported due to loss of control plane or loss of OSC. Generally, the switching controller may request the ROADM card 420 to check the SCH OPR LOW condition based on OPM scan during reversion. However, this result of scanning may not be reported to the switching controller due to ROADM card rebooting (co-related with the card status). Basically, the motivation to consider OLDP status messages 412 may be not to trust the FDI-O conditions as genuine (either presence of an OLDP alarm or even its absence depending on a possibly critical service affecting decision).

As described above, the OPSM 400 may receive DF status messages 432 from the LS card 430 via an inter-card communication network. The DF status at any point of time may correspond to the working or protecting path from which a selector is sourcing the traffic. Because the DF status may correspond to one of the working or protecting path at any point of time, once switching from the active path to the standby occurred due to a DF trigger, the switching controller may mark the previous path on which the DF had come as an 'intermediate' state. The switching decisions may need to be taken with caution because it might take time for other fault conditions, such as OLDP and SCH OPR LOW, to surface. It should be noted that DF triggers may happen due to a power glitch even if the OLDP or SCH OPR LOW fault conditions did not come. Thus, the switching controller may need to handle recovery after such a power glitch. The DF condition present on the active path may be inherited by the standby path on a subsequent protection switch.

The DF status message 432 may also come due to patch cable cut between the OPSM 400 and the LS card 430. To distinguish such a case from other fault conditions, LS PD status message 434, indicating a LS PD OLOS condition, may be used in con-junction with OPSM PDs on both working and protecting line of the OPSM card 400. In addition, the DF status message 432 may come in the absence of optical failure conditions when the faulted area is at digital zone in the LS Card 430. Such a condition should not result in an oscillation of switching from the working path to the protecting path and vice-versa. In such cases, the head end (HE) in the upstream direction may source a client signal fail (CSF) or some throttling mechanism that may need to be built at the tail end (TE) in the downstream direction to prevent switch oscillations.

In an embodiment, upon switching from an active path to a standby path due to a DF trigger, the switching controller may mark the previous path (i.e. old active path) as an 'intermediate' state (e.g. intm_S) and request an on-demand OPM scan to the ROADM card 420. If the switching controller receives a status report on the path from the ROADM card 420, an OLDP status messages from the OSC card 410, or 10 seconds time-out, whichever happens first, the switching controller may clear the 'intermediate' state on the previous active path. During 10 seconds, the switching controller may allow the ROADM card 420 to report the SCH OPR LOW condition caused by the on-demand scan or the OSC card 410 to report the OLDP fault condition through the OLDP status message 412 to propagate the status to the downstream.

In another embodiment, when the working path is switched to the protecting path due to a DF on the working path, if there are no alarms present on the working path, the WTR state transition may be held-off up to 10 seconds because the working path is in the 'intermediate' state. If the OSC Card 410 and the ROADM card 420 are up and there are no alarms present on the working path, the WTR state transition may need to happen after the 10 secs because the 'intermediate' state is cleared.

In another embodiment, if an active path is switched to a standby path solely due to the DF on the previous path, the switching controller may keep the 'intermediate' state on the previous path for a certain time until any 'hard' fault conditions occurs on the new path. This may still trigger a switch to the previous path because the previous path is failure-free (assuming no other hard-faults) together with the 'intermediate' state and the new path is anyways faulted. Thus, the switching controller may still try to make a switching decision to the other path. This is different from the above embodiment that the WTR state transition may be held-off up to 10 seconds. In the above embodiment, the protecting path is failure free. Thus, it is not beneficial to lose the traffic even though the WTR may be initiated because the working path is still doubtful because of the 'intermediate' state. Thus, with respect to both embodiments, the switching controller may make a 'safe' decision.

In another embodiment, after switching from an active path to a standby path due to a DF trigger, the switching controller may receive a DF clear on the new path within 1 second. Otherwise, after this time-window is expired, the switching controller may deem the new path to have the DF condition that may act as a new trigger to the switching controller. The switching controller may mark the new path as an 'intermediate' state (e.g., intm_A). If a one second timer expires or a fault condition is reported from the LS card 430 for DF, the switching controller may trigger to clear this 'intermediate' state. The 1 second timer may be to allow the fault clearance to come from the LS card 430. In case the LS card 430 becomes un-reachable during this 1 second window without any fault clearance coming, the DF condition may be deemed to have happened on this path. Thus, there may be two things that can be undesirable during this one second window. If an actual DF condition occurs or is already on in this path, then it may not be honored because the honoring happens only after the one second window unless the LS card 430 reports the DF condition again. This may be all right because there may not be any strict requirement to handle back to back faults on different paths within 50 ms unless the switching controller is supported by a hard fault such as PD OLOS, OLDP, or the like. Secondly, if the LS card 430 reboots during this time window without a fault clearance being reported, this path may be assumed to be faulty after the one second timer is expired, even though it is not faulty since the clearance reporting did not happen. In order to solve this problem, during this one second window, if the switching controller detects that the LS card 430 is unreachable, then the path may continue to remain in the 'intermediate' state (e.g. intm_A_ext) until the LS card 430 becomes reachable. During such an 'intermediate' state, the switching controller may make safe decisions when the supporting conditions are conclusive enough to deem the path as faulty or faulty-free. The switching controller may not handle fault scenarios where the LS card 430 could have reported DF but did not report it since it is rebooting. This problem may not be solved unless there is a supporting condition such as OLDP faults, PD OLOS, or the like. To come out of the intermediate state (i.e. intm_A_ext), DF fault clear or report condition may need to happen.

With respect to the embodiment described above, the switching decision may be simple. If the switching controller sees a hard fault condition on the current active path that is in the 'intermediate' state, the switching controller may need to initiate a switching decision to switch to the standby path because, during the 'intermediate' state on the active path, there is a hard fault condition happened although the switching controller receives the DF status message 432 indicating the DF condition in LS card 430.

With respect to the embodiment described above, when the switching controller triggers switching from the active path to the standby path where the active path has an 'intermediate' state, the new path may inherit the 'doubtful' DF condition from the previous path.

With respect to the embodiment described above, the switching controller may not treat the active path in an 'intermediate' state as a failure condition on the active path until the 'intermediate' state is cleared and DF condition is still on the active path.

In an embodiment, if the switching controller receives an LS PD status messages 434 indicating OLOS condition and there is no PD OLOS on line ports of the OPSM 400 on the working and protecting path, the switching controller may deduce that this is a case of patch cable cut between the OPSM 400 and the LS card 430. Thus, the switching controller may not make switching decisions for optical channel protection. This may also prevent switching oscillations.

In another embodiment, when there is a DF condition as a sole condition on the working and protecting path that is triggering switch oscillations, the switching controller may be held off with a throttling logic with an exponential back-off to save the life of selector. This can happen if the fault is at the digital layer.

To appreciate the need for the 'intermediate' state, one may visualize the problem in a broader perspective where the DF fault triggers can happen due to a glitch where the fault clearance never happens after the selector switches the path. Thus, the associated DF condition may not be permanently kept. A philosophical visualization of the 'intermediate' state may be a 'sticky' condition with respect to a DF on the active and standby paths while the switching controller makes safe decisions. The safe decision may be totally context dependent on a case by case basis.

Although it is not shown in FIG. 4, the OSC card 410, ROADM card 420, and the LS card 430 may transmit card reachability status messages to the OPSM 400 via the inter-card communication network. A card being unreachable may mean that alarm conditions that are reported by the card may be stale. In other words, the card reachability status messages may indicate the control plane connectivity between the cards. If the control plane over the inter-card network is disconnected, the card reachability status may be determined as stale. Thus, the switching controller may need to take such conditions with precaution and make 'safe' decisions.

In an embodiment, the switching controller may not initiate reversion on a path whose respective cards (e.g. OSC card 410 for OLDP status message 412, and ROADM card 420 for optical power status message 422) are unreachable.

In another embodiment, during the WTR state, if the cards (e.g. OSC card 410 for OLDP status message 412, and ROADM card 420 for optical power status message 422) on the standby path become unreachable, the switching controller may cancel the WTR and initiate the WTR after the cards are up and all the alarm conditions are absent.

In another embodiment, even if some cards (e.g. ROADM card 420 for optical power status message 422 or LS card 430 for DF status message 432) become unreachable on the active path, the switching controller receives a hard failure indication such as PD OLOS on the active path, the switching controller may initiate a protection switching even though some cards are still unreachable.

In yet another embodiment, if: (1) some cards become unreachable on the standby path; (2) there is no hard failure condition such as PD OLOS; and (3) the current active path suffers a hard failure condition, the switching controller may initiate the protection switching because the current path is going down anyway. Thus, it is safe to switch to the other path. It should be noted that even though OLDP fault conditions may be present on the standby path and the associated OSC card 410 would have gone for a reboot, the switching controller may still try a protection switching from the active path to this standby path. Thus, this situation may be treated as a soft failure. This may be true with respect to the standby path, but may not be true with respect to the active path when PD OLOS and DF are absent, because it may lead to a traffic impacting decision. Thus, the definition of a hard fault or soft fault may be context dependent.

The OPSM 400 may receive super-channel client signal fail (SCH CSF) messages from a headend ADD NE. The headend ADD NE may detect the client signal failure and insert the SCH CSF in the OLDP signaling to be carried downstream via OSC. The SCH CSF may represent a case where the light source itself is bad and there is no diverse path available to destination.

In an embodiment, upon receiving the SCH CSF on the working or protecting path, the switching controller may determine the selector as a freeze state where just alarm status messages are cached by the switching controller but no protection switching decisions are taken. If the SCH CSF is absent on both working and protecting path, this may lead the switching controller to reevaluate with respect to other fault conditions and appropriate decisions may be taken.

Figure 5:
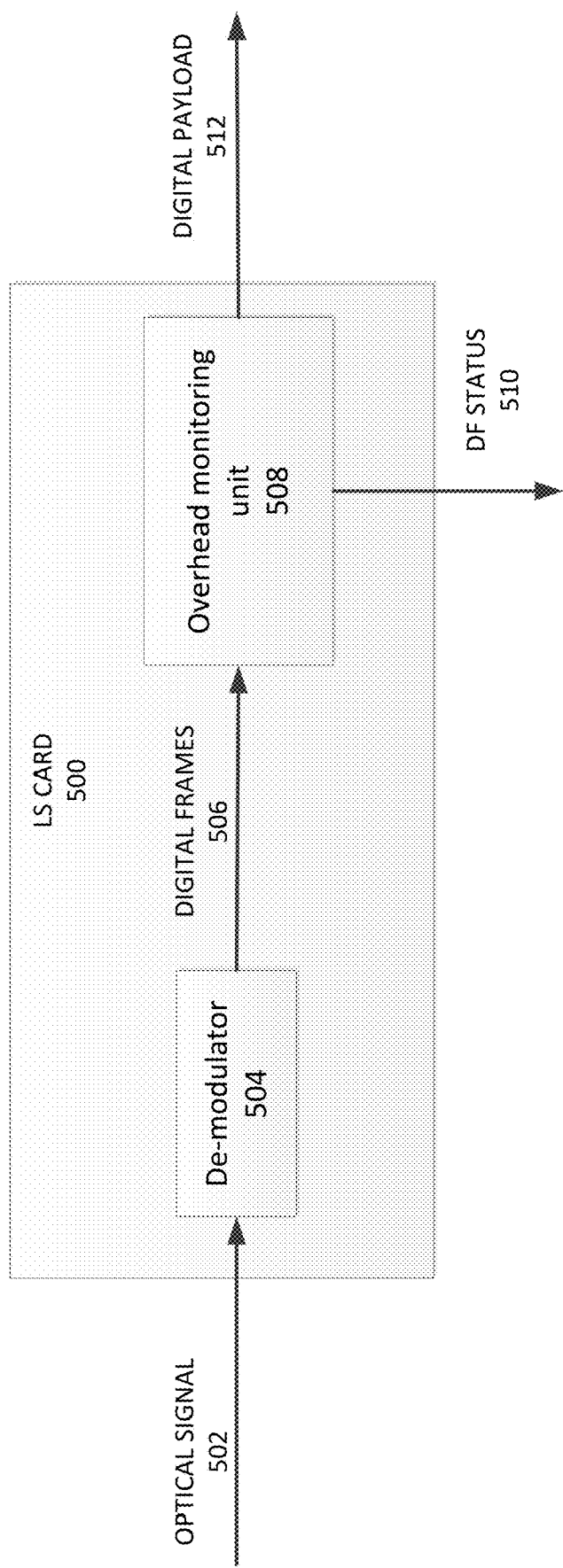
FIG. 5 is a diagram illustrating a digital fault monitoring process by a light source card.

FIG. 5 is a diagram illustrating a digital fault monitoring process by a light source (LS) card 500. The LS card 500 may transmit or receive optical signals 502 via optical fibers. The optical signals may include a single super-channel or multiple super-channels. The LS card may include a demodulator and overhead monitoring unit 508 for generic L1 digital fault monitoring process. The demodulator 504 may receive optical signals and convert the optical signals to digital frames 506. This means that client digital data is demodulated from the optical data by the demodulator 504. The demodulator 504 may be any type of digital signal processing (DSP) device that performs modulation or demodulation. The digital frames 506 demodulated from the optical signal 502 may be an Optical Transport Unit (OTN) or Synchronous Optical Networking/Synchronous Digital Hierarchy (SONET/SDH) specific encapsulation.

The digital frames 506 may be decoded by an overhead monitoring unit 508. The overhead monitoring unit 508 may be a hardware block that monitors digital traffics to generate digital payload 512 and digital status 510. Such a hardware block may include a field programmable gateway array (FPGA) or Application Specific Integrated Circuit (ASIC). The digital status 510 representing digital fault conditions may be generated based on monitoring the digital frames 506. For example, if a super channel landing on the LS card is dead or has no power on it, the overhead monitoring unit may recognize that the digital frame 506 includes a digital fault by virtue of seeing loss of frames. That means, some of digital frames demodulated from the super-channel may be garbled or some block information on the digital frames 506 may be missing. After the detecting the digital fault, the overhead monitoring unit 508 may generate a DF status messages 510 and transmit the message to the OPSM 400 as a control plane message over the intra-card communication network. The digital payload may be the client digital traffic mapped and groomed through L1 specific digital transport technologies (OTN/SONET/SDH). For example, the payload may be Ethernet, Plesiochronous Digital Hierarchy (PDH), Fiber-Channel payload, and the like.

As described above, an OPSM card that houses a bridge and selector may be used for optical channel protection. It may be assumed that the LS card sources one super-channel and by using the OPSM card, the single super-channel is protected. In some systems, however, an LS card may source multiple super-channels where each of the super-channels sourced from the LS card may go to different degrees through ROADM cards. This may be an efficient architecture in term of cost and L0 restoration considerations because the super-channels may be dynamically routed to different degrees based on failure conditions.

Figure 6:
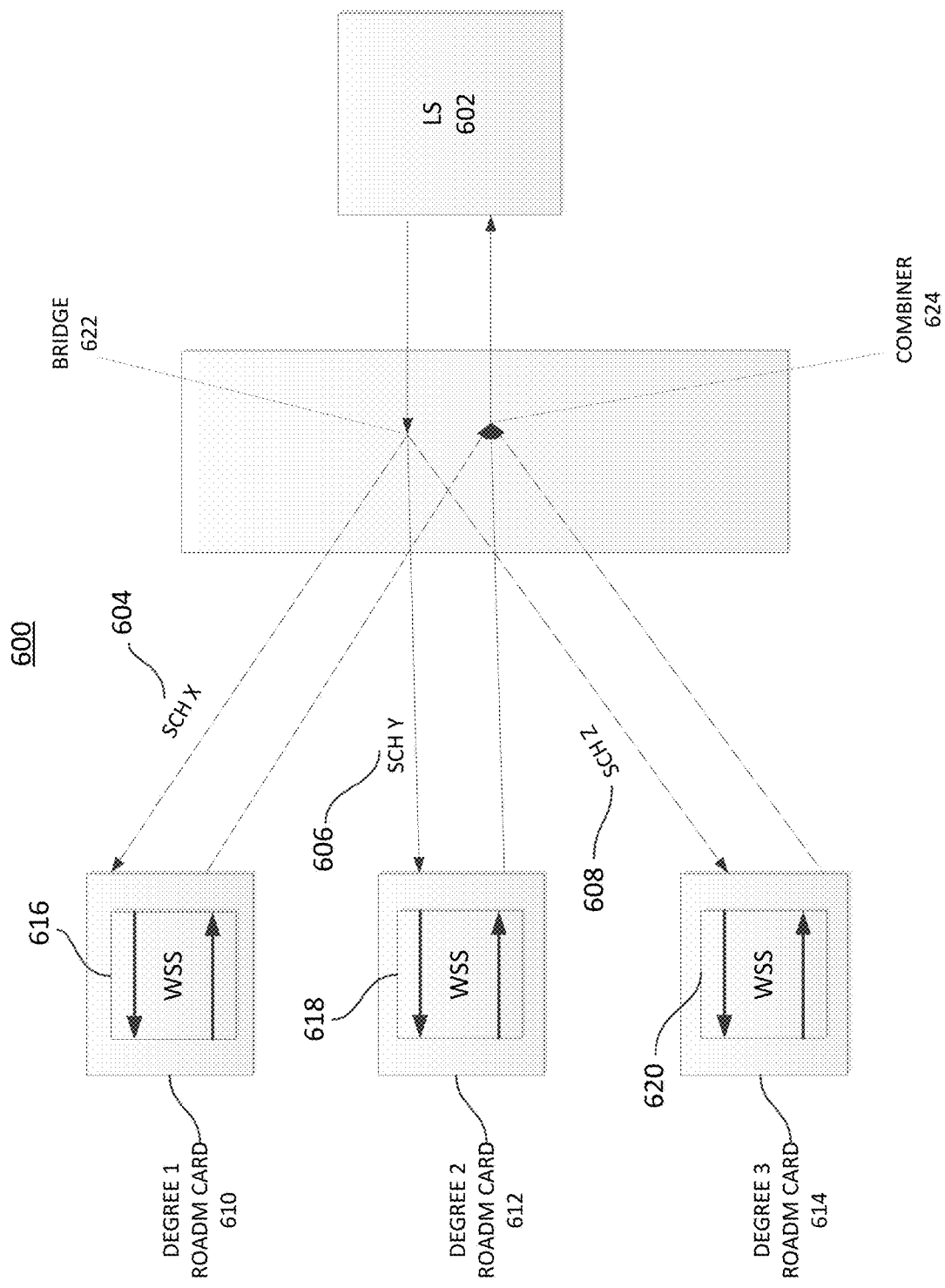
FIG. 6 is a system diagram illustrating multiple super-channel transmission by a light source card to multiple Reconfigurable Optical Add Drop Multiplexer (ROADM) cards.

FIG. 6 is a system diagram illustrating multiple super-channels 604, 606, 608 transmitted by a light source 602 to multiple Reconfigurable Optical Add Drop Multiplexer (ROADM) cards 610, 612, 614. Unlike the OPSM-based optical channel protection system 200 in FIG. 2 where the LS card 250 sources a single super-channel, the optical networking system 600 may not use an OPSM card because the LS 602 sources multiple super-channels 604, 606, 608. For example, the LS 602 may source multiple super-channels, SCH X 604, SCH Y 606, and SCH Z 608, to a bridge 622 to distribute the super-channels to multiple degrees ROADM cards 610, 612, 614. The bridge 622 may be a power splitter to distribute the traffics to different directions. After distributing the multiple super-channels, the SCH X may go from the degree 1 ROADM card 610 further downstream through WSS 616, the SCH Y may go from the degree 2 ROADM card 612 further downstream through WSS 618, and the SCH Z may go from the degree 3 ROADM card 614 further downstream through WSS 620. The multiple degrees of the ROADM cards 610, 612, 614 may indicate directions of data plane links from the ROADM cards 610, 612, 614. The combiner 624 may be passive device that simply combines super-channels.

The degree 1 ROADM card 610, the degree 2 ROADM card 612, and the degree 3 ROADM card 614 may actually receive all of the three SCH X 604, SCH Y 606, and SCH Z 608 on their tributary ports. This means that the bridge 622 may simply send all the super-channels, SCH X 604, SCH Y 606, and SCH Z 608, to all degrees of the ROADM cards 610, 612, 614. The selection of a super-channel may be performed by WSSs 616, 618, 620 based on the service provisioning in the ROADM cards 610, 612, 614. Specifically, a user or network operator may specify the service provision of the ROADM cards 610, 612, 614 to carry a single super-channel to a degree. For example, the degree 1 ROADM card 610 may provision the SCH X 604 but not provision SCH Y 606 and SCH Z 608, thereby carrying the SCH X 604 to the degree 1 direction. If a user wants to pass only SCH Y 606 to the degree 2 ROADM card 612, the user may provision SCH Y but block SCH X and SCH Z in degree 2 ROADM card 612. Thus, the super-channel SCH Y may only be carried to the degree 2 direction. Similarly, if the user wants to pass only SCH Z 614 to the degree 3 ROADM card 614, the user may provision SCH Z and block SCH X and SCH Y in degree 3 ROADM card 614. Thus, the super-channel SCH Z may only be carried to the degree 3 direction.

This may be a typical example of sliceable multiple super-channels originated from LS 602. A slice may mean each of the constituent band in an N GHz (N=12.5, 6.25, 3.125) spaced frequency band of an optical spectrum. A slice may be a resolution at which the power levels can be measured by the optical monitoring device. The power level being measured by the optical monitoring device may represent the total optical power carried by the band represented by that slice. A super-channel pass-band may be composed of a set of contiguous slices.

Figure 7:
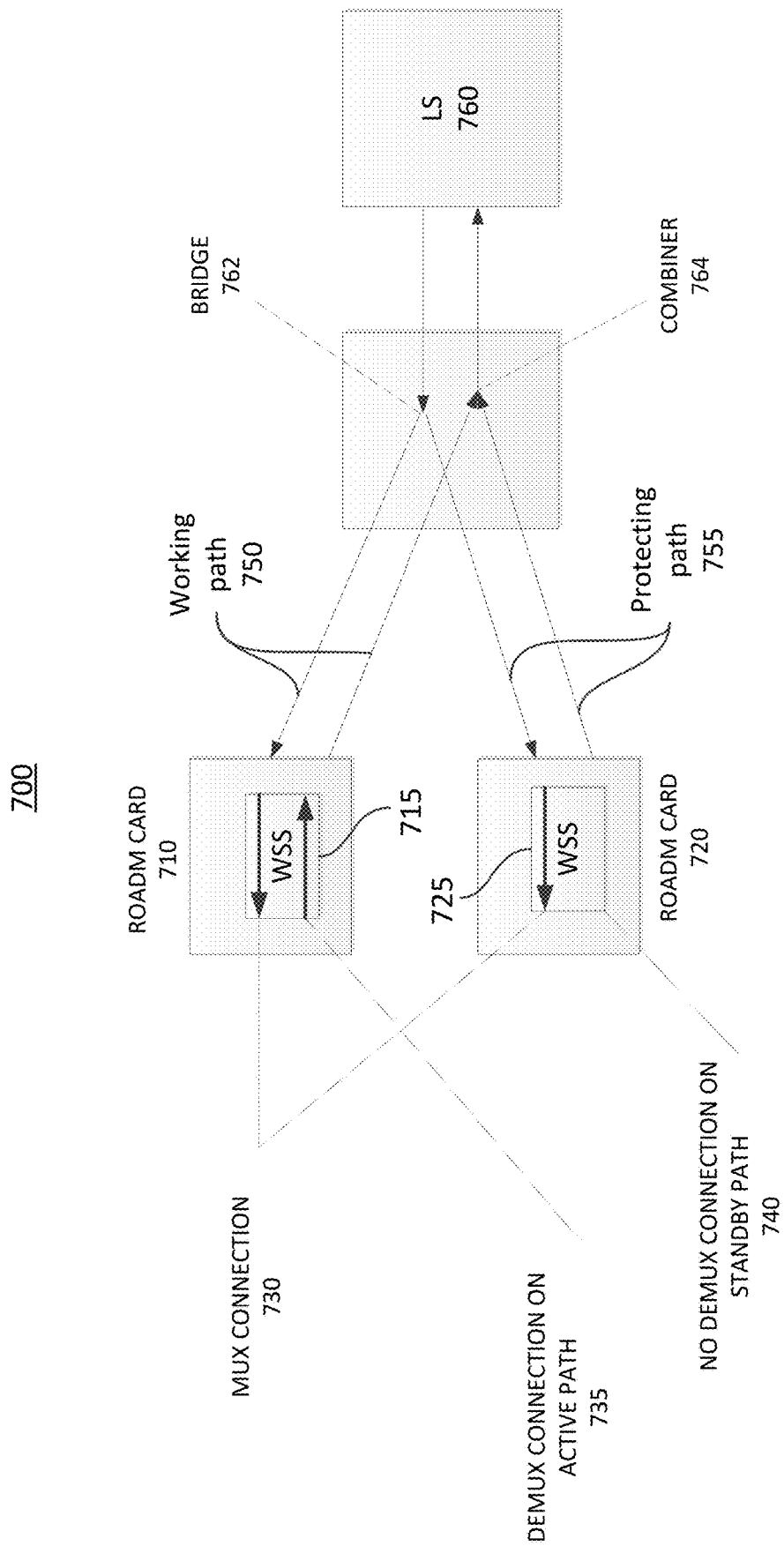
FIG. 7 is a system diagram of another example optical channel protection system.

FIG. 7 is a diagram illustrating an example optical channel protection system 700 that may be used within the optical networking system 600 in FIG. 6. As described above, the optical channel protection system 700 may not include an OPSM to protect a super-channel because multiple super-channels pass through the OPSM. The optical channel protection system 700 may provide channel protection by harnessing WSSs 715, 725 on the ROADM cards 710, 720 as distributed selectors. Specifically, in the transmitting side (i.e. from LS 760 to ROADM cards 710, 720), a LS 760 may source multiple super-channels. The bridge 762 distributes the multiple super-channels to both working 750 and protecting paths 755. As described above, the ROADM cards 710, 720 may carry one super-channel among the multiple super-channels through a mux connection 730 of the WSSs 715, 725 based on the service provisioning. In the receiving side (i.e. from ROADM cards 710, 720 to LS 760), the switching controller may control WSSs 715, 725 in demux connections 735, 740 to connect to the working 750 and protecting paths 755 depending on fault conditions. As shown in FIG. 7, the switching controller may determine the WSS 715 on demux connection 735 to connect its line port to its tributary port, thereby selecting the active path. Similarly, the switching controller may determine the WSS 725 on demux connection 740 to disconnect its line port to its tributary port, thereby selecting the standby path. Thus, optical channel protection may be achieved by virtue of selecting two different modules: the WSS 715 for an active path and the WSS 725 for a standby path.

The switching controller may be located anywhere in an optical networking system. For example, the switching controller may reside in a centralized controller or may be hosted in both active and standby ROADM cards 710, 720 at the same time. If the switching controller is located in both active and standby ROADM cards 710, 720 at the same time, the switching controller in the active path 735 may be allowed to take decisions while the switching controller in the standby path 740 may be kept in sync with the switching controller in the active path 735 with respect to alarms and status conditions. In an embodiment, the switching controller may be hosted in the ROADM card 710 on the active path 735 as a master controller and may be hosted in the ROADM card 720 on the standby path 740 as a slave controller. Both master and slave controller may communicate each other via inter-card communication network. In another embodiment, the switching controller may reside in the LS 760 or a card holding the bridge 762 and the combiner 764.

Although it is not shown in FIG. 7, the optical channel protection system 700 may include two or more ROADM cards for multiple super-channel protection. If a user or network operator want to protect SCH X 604, SCH Y 606, SCH Z 608 in the transmitting side, the SCH X 604 may go to the degree 1 ROADM card 610 for working path and go to the degree 2 ROADM card 612 for protecting path. At the same time, the SCH Y 606 may go to the degree 2 ROADM card 612 for working path and go to the degree 1 ROADM card 610 for protecting path. Similarly, the SCH Z 608 may go to the degree 3 ROADM card 614 for working path and go to the degree 1 ROADM card for protecting path. In the receiving side, for the SCH X 604, the switching controller may select the WSS 616 for the active path and select the WSS 618 for the standby path by blocking SCH X 604. Similarly, for the SCH Y 606, the switching controller may select the WSS 618 for the active path and select the WSS 616 for the standby path by blocking SCH Y 606. For the SCH Z 608, the switching controller may select the WSS 620 for the active path and select the WSS 616 for the standby path by blocking SCH Z 608.

As described above, the same ROADM card may carry multiple super-channels for its working path and protecting path. For example, the ROADM card 610 may carry the SCH X 604 for its working path but carry the SCH Y 606 for its protecting path based on the service provisioning. Similarly, the ROADM card 612 may carry the SCH Y 606 for its working path but carry the SCH X 604 for its protecting path. Lastly, the ROADM card 614 may carry the SCH Z 608 for its working path but carry the SCH Y 606 for its protecting path. Thus, a ROADM card may host n number of super-channels for its working path and n number of super-channels for its protecting path.

It should be noted that that the same constraints which were described in an OPSM based optical channel protection system 200 may also be applicable in this non-OPSM based optical channel protection system 600. It should also be noted that that the same fault conditions which were described in the switching controller 300 in FIG. 3 may be applicable in the switching controller of the non-OPSM based optical channel protection system 600.

Figure 8:
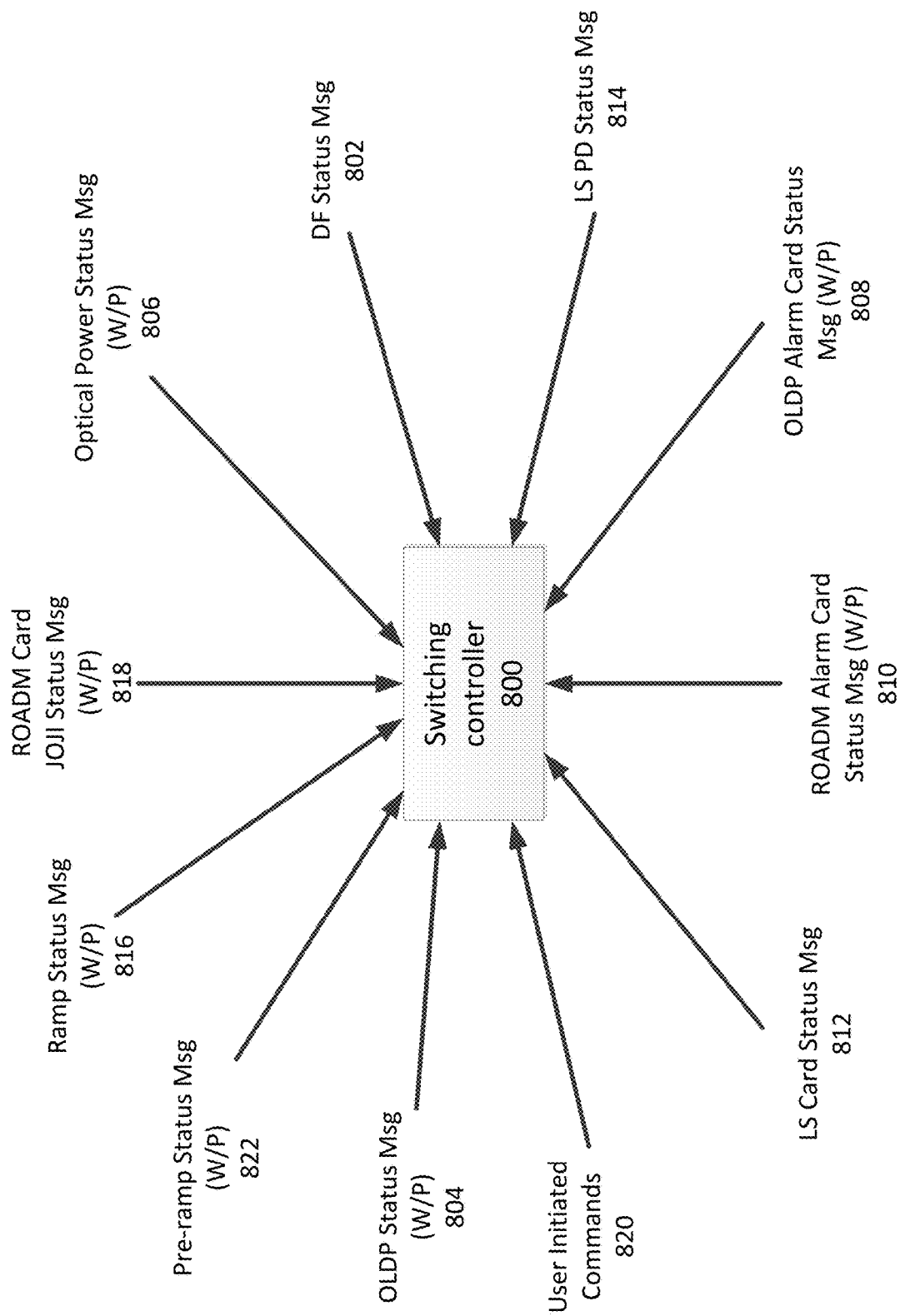
FIG. 8 is a diagram of an example switching controller that may be used within the optical channel protection system illustrated in FIG. 7.

FIG. 8 is a diagram of an example switching controller 800 that may be used within the optical channel protection system 700 in FIG. 7. The switching controller 800 may receive a digital fault (DF) status message 802 from a LS 760. The DF fault status message 802 may indicate whether a digital frame demodulated from an optical signal include a fault. The switching controller 800 may further receive Optical Layer Defect Propagation (OLDP) status messages 804 for the working path 750 and the protecting path 755 from OSC cards. The OLDP status messages 804 may indicate an OSC status of the super-channel on the working path 750 or the protecting path 755. The switching controller 800 may receive optical power status messages 806 for the working path 750 or the protecting path 755 from ROADM cards 710, 720. The optical power status messages 806 may indicate measured power levels of the super-channels on the working path 750 or the protecting path 755. The measured power level in the super-channels may be measured by OPM devices. The optical power status messages 806 may include an Optical Power Received (OPR) low alarm status and an OPR unreliable alarm status.

The switching controller 800 may further receive card status messages that indicate whether control plane connectivity between the switching controller 800 and other cards is stale or not. Specifically, the switching controller 800 may receive OLDP alarm card status messages 808 for the working path 750 and the protecting path 755, ROADM alarm card status messages 810 for the working path 750 and the protecting path 755, and a light source card status message 812. The OLDP alarm card status messages 808 may be received from OSC cards and may indicate the control plane connectivity between the OSC cards and the switching controller 800. The ROADM alarm card status messages 810 may be received from ROADM cards 710, 720 and may indicate the control plane connectivity between the ROADM cards 710, 720 and the switching controller 800. The light source card status message 812 may be received form a LS 760 and may indicate the control plane connectivity between the LS 760 and the switching controller 800.

The switching controller 800 may receive a Light Source Photo Diode (LS PD) status message 814 that indicates whether there exists an Optical Loss of Signal (OLOS) condition at the LS 760 in a direction where the LS 760 receives the optical signal from the working path 750 or the protecting path 755. The LS 760 may include one or more photo diode to measure power level of the received optical signals on it. Moreover, the switching controller 800 may receive ramp status messages 816 for the working path 750 and the protecting path 755 from the ROADM cards 710, 720. The ramp status messages 816 may indicate ramp process status of the super-channel in de-multiplexing direction of the ROAMD cards 710, 720. Specifically, the ramp process status may represent whether ramp process in the ROADM cards 710, 720 is completed or in progress.

Unlike the switching controller 300 in the OPSM-based optical channel protection system 200, the switching controller 800 may receive ROADM card Jack Out Jack In (JOJI) status message 818 from the ROADM cards 710, 720 instead of the OPSM PD OLOS message 318. Based on the ROADM card JOJI status message 818, the switching controller 800 may detect whether the ROADM card 710, 720 on the working 750 and protecting paths 755 is powered off or not. Moreover, the switching controller 800 in the non-OPSM based optical channel protection system 700 may further receive a pre-ramp status message 822 from the ROADM cards 710, 720. The pre-ramp status message 822 may indicate whether a ramp process of the super-channel in a de-multiplexing direction of the WSSs 715, 720 can be initiated. Specifically, to initiate a ramp process for the WSSs 710, 720 in demultiplexing direction, there may be certain gating conditions that need to be satisfied. Such aggregated gating conditions may be called as a "pre-ramp" status. If the pre-ramp status indicates READY_TO_RAMP, then the ramp process may be initiated. Otherwise, the ramp process may not be initiated and set to be NOT_READY_TO_RAMP status. The gating conditions may include a stable input power that is received on the line ingress port. This may be to ensure that multiple power adjustments are not done in the network to avoid unwanted power spikes. For all upstream modules in the complete link until the DROP NE, the control plane connectivity may need to be up so that the flow of control plane information that carries latest automatic power control loop information may be assured to be present on the DROP NE. Stale information may lead to wrong decision making. Local control loop/configuration information may need to be available. In some embodiment, when the control plane connectivity with the management entity is lost or the de-mux card itself is coming up post reboot, this local control loop/configuration information may not be available. In such cases, the ramp process may not be initiated, too.

Upon receiving the messages described above, the switching controller 800 may make a safe or best decision whether to switch a current active path to a standby path. Specifically, the switching controller 800 may determine the working path 750 as an active path and the protecting path 755 as a standby path, or the protecting path 755 as an active path and the working path 750 as a standby path, based on the DF status message 802, OLDP status messages 804, optical power status messages 806, OLDP alarm card status messages 808, ROADM alarm card status messages 810, a light source card status message 812, a LS PD status message 814, ramp status messages 816, pre-ramp status message 822, ROADM card JOJI status message 818, user initiated commands 820, and the like.

In an embodiment, the switching controller 300 in the OPSM based optical protection system 200 may deem the working path 212 or protecting path 215 to be healthy only when the ramp status message 316 includes that the ramp status is completed. In case that the control plane connectivity between the containing cards is unreachable, the ramp status may be assumed to be stale and the switching controller may take safe decisions on a best effort basis.

In non-OPSM based optical channel protection system 700, before the traffic is switched from one of the working path 750 or protecting path 755, it may be obvious that the ramp status would be incomplete for the path from which the traffic is to be switched because one of the WSSs 715, 725 is kept unblocked for the switched path. This may be a difference from the OPSM based optical channel protection system 200 where the WSSs in the demultiplexing direction are not dependent on the selector status but dependent on the pre-ramp status. The switching controller may control the selector on the OPSM card but does not control the WSS device in demultiplexing direction. In case of non-OPSM based optical channel protection system 700, the selector status in the switching controller may also play a role along with the pre-ramp status of the WSS in the demultiplexing direction. Thus, in the non-OPSM based optical channel protection system 700, the pre-ramp status of the de-mux WSS may play a role with respect to decision making by the switching controller 800, while in the OPSM based optical channel protection system 200, the pre-ramp status may not be used by the switching controller 300.

In another embodiment, de-mux ramp status of a particular path may be used "after" the protection switch decision is made to source from the working 750 or protecting path 755. A complete de-mux ramp status may indicate that the switching/selection operation is finished after the switching controller 800 made its decision.

In another embodiment, if de-mux ramp status of a particular path remains as incomplete after the switching controller 800 made its decision to source from that path and a time-out limit is expired, this may indicate some failure after the switching controller's 800 decision. Thus, a roll-back mechanism may be built in the switching controller 800 when the previously sourced path is healthy. In non-OPSM based optical channel protection system 700, the de-mux ramp status of a particular path may be used after the switching controller 800 made a decision to source from the path.

In non-OPSM based optical channel protection system 700, the switching controller 800 may deem a particular path to be healthy only if the switching controller 800 receives a pre-ramp status message 822 indicating that the particular path is ready to ramp. However, the switching controller 800 may deem a particular path to be unhealthy if the switching controller 800 receives the pre-ramp status message 822 indicating that the particular path is not ready to ramp. Unlike the ramp status message 816, the pre-ramp status message 822 may be used before the switching controller 800 makes the decision to source the traffic from a particular path.

In OPSM based optical channel protection system 200, the pre-ramp status message 822 may not necessarily be used. However, the switching controller 300 may use the pre-ramp status message 822 if required for other kinds of co-relation in the switching controller 300.

Figure 9:
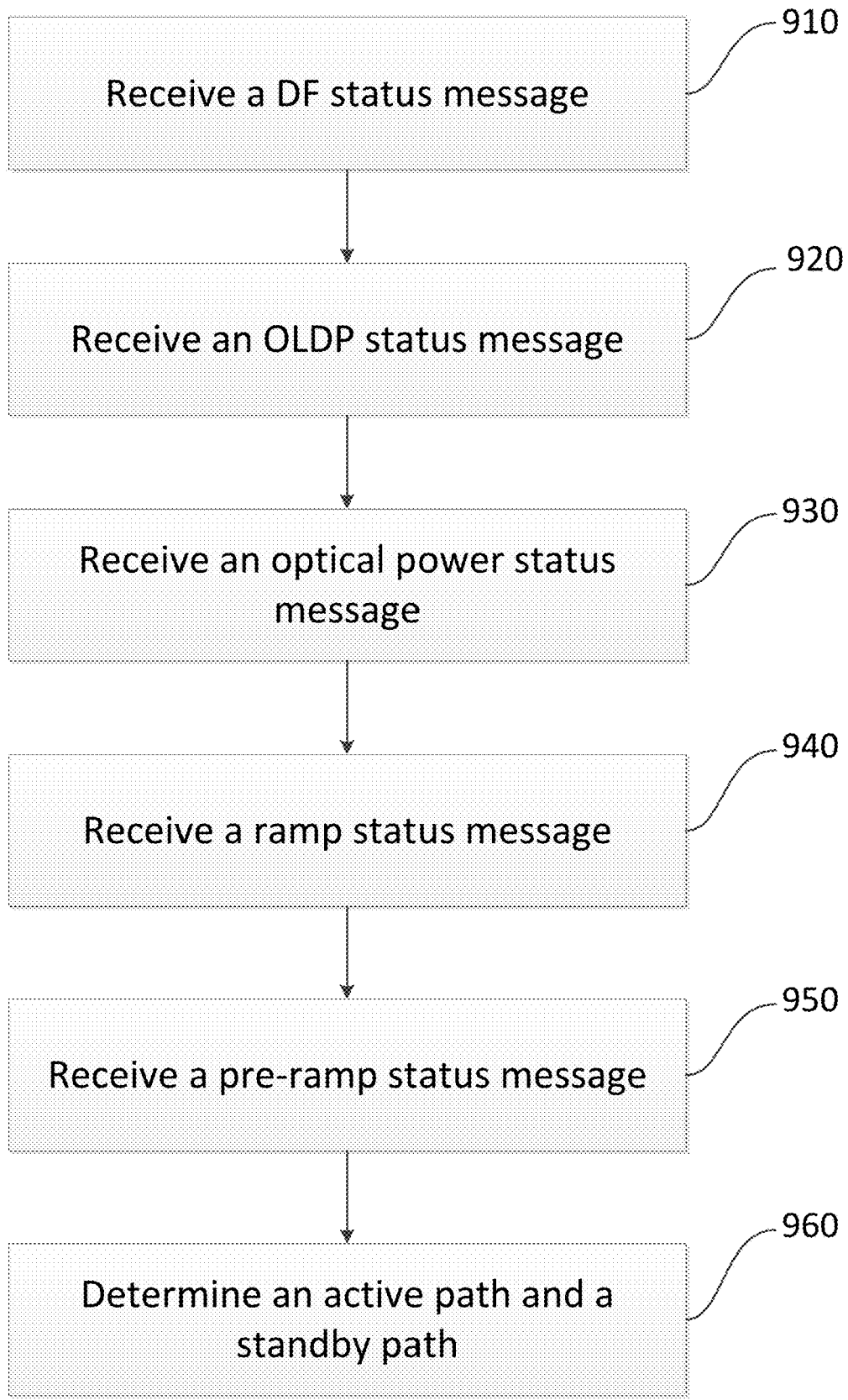
FIG. 9 is a flow diagram illustrating an example procedure for providing an optical channel protection by a switching controller.

FIG. 9 is a flow diagram illustrating an example procedure for providing an optical channel protection by a switching controller described herein. The switching controller may include a processor and a memory. The processor may be configured to run APS engine to make a decision whether to switch the current active path to the standby path. The switching controller may reside in any part of optical channel protection system. For example, the switching controller may be located in an OPSM card, OADM card, ROADM card, OSC cards, LS card, network management entity in the north bound layer, or the like.

At step 910, the switching controller may receive a digital fault (DF) status message from a LS card or any type of light source via control plane signaling. The DF fault status message may indicate whether a digital frame demodulated from an optical signal include a fault. The optical signal may include one or more super-channel that are received from a working path or protecting path. The one or more super-channel may indicate a group of multiple wavelengths that originated from the LS card. At step 920, the switching controller may receive an OLDP status messages from an OSC card or the like via control plane signaling. The OLDP status message may indicate an OSC status of the one or more super-channel on the working path or the protecting path. At step 930, the switching controller may receive optical power status messages from OADM cards, ROADM cards, or any type of power measurement device in WDM system. The optical power status messages may indicate measured power levels of the one or more super-channel on the working path or the protecting path. The measured power level in the one or more super-channels may be measured by OPM device or the like. The optical power status messages may include an Optical Power Received (OPR) low alarm status and an OPR unreliable alarm status. The OPR low alarm status may indicate the measured super-channel power is below a certain threshold. The OPR unreliable alarm status may indicate the measured super-channel power is below an OPM reliability threshold, for example, −20 dBm per slice.

At step 940, the switching controller may receive ramp status messages for the working and protecting paths from OADM cards, ROADM cards or the like. The ramp status messages may indicate ramp process status of the super-channel in de-multiplexing direction of the OADM cards. Specifically, the ramp process status may represent whether ramp process in the OADM cards is completed or in progress. In case of non-OPSM based optical channel protection system, at step 950, the switching controller may further receive a pre-ramp status message from the OADM cards or ROADM cards. The pre-ramp status message may indicate whether a ramp process of the super-channel in a de-multiplexing direction of the WSSs can be initiated.

At step 960, upon receiving the status messages described above, the switching controller may determine whether to switch a current active path to a standby path based on the status messages. Specifically, the switching controller may select the working path as an active path and the protecting path as a standby path, or the protecting path as an active path and the working path as a standby path, based on the DF status message, OLDP status messages, optical power status messages, ramp status messages and the like. In case of non-OPSM based optical channel protection system, the switching controller may determine an active path and a standby path based on the DF status message, OLDP status messages, optical power status messages, ramp status messages, pre-ramp status messages and the like.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, metal-oxide semiconductor field-effect transistors (MOSFETs), ASICs, FPGAs circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor that implements aspects of the embodiments.

The suitable processors may include circuitry to implement the methods provided herein. The circuitry may include receiving circuitry, processing circuitry and transmitting circuitry.

The methods and flow charts provided herein may be implemented in a computer program, software, or firmware incorporated in a non-transitory computer-readable storage medium for execution by a general purpose computer or a processor. Examples of non-transitory computer-readable storage media, include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Further, the devices according to various embodiments described herein may be interspersed among other devices depending on the functionality of the microelectronic device. In addition, the number and components of the devices may vary depending on the functionality of the microelectronic device. By way of example, the number of correlators may vary from two to dozens.

What is claimed is:

1. A method for providing optical channel protection in an optical networking system, the method comprising:
    receiving, from a light module, a digital fault status message indicating whether a digital frame demodulated from an optical signal includes a fault; and
    determining, based on the digital fault status message, a first optical path as an active path and a second optical path as a standby path;
    receiving, from the first OSC module, a first Optical Layer Defect Propagation (OLDP) status message indicating an OSC status of the super-channel on the first optical path;
    receiving, from the second OSC module, a second OLDP status message indicating an OSC status of the super-channel on the second optical path;
    receiving, from the first OADM module, a first optical power status message indicating a first measured power level of the super-channel on the first optical path;
    receiving, from the second OADM module, a second optical power status message indicating a second measured power level of the super-channel on the second optical path;
    determining, based on at least one of the first OLDP status message, the second OLDP status message, the first optical power status message, the second optical power status message, or the digital fault status message, the first optical path as an active path and the second optical path as a standby path;
    receiving, from the first OSC module, a first OLDP alarm card status message indicating a control plane connectivity between the first OSC module and the switching controller;
    receiving, from the second OSC module, a second OLDP alarm card status message indicating a control plane connectivity between the second OSC module and the switching controller;
    receiving, from the first OADM module, a first OADM alarm card status message indicating a control plane connectivity between the first OADM module and the switching controller;
    receiving, from the second OADM module, a second OADM alarm card status message indicating a control plane connectivity between the second OADM module and the switching controller;
    receiving, from the light module, a light source card status message indicating a control plane connectivity between the light module and the switching controller; and
    determining, based on at least one of the first OLDP status message, the second OLDP status message, the first optical power status message, the second optical power status message, the first OLDP alarm card status message, the second OLDP alarm card status message, the first OADM alarm card status message, the second OADM alarm card status message, the light source card status message, or the digital fault status message, the first optical path as an active path and the second optical path as a standby path,
    wherein the optical signal includes a super-channel that is received from the first optical path or the second optical path,
    wherein the first optical path is operatively connected to a first Optical Supervisory Channel (OSC) module, a first Optical Add Drop Multiplexer (OADM) module and the light module, and
    wherein the second optical path is operatively connected to a second OSC module, a second OADM module and the light module.

2. The method of claim 1, wherein the first optical path is a work path and the second optical path is a protect path.

3. The method of claim 1, further comprising:
    receiving, from the light module, a Light Source Photo Diode (LS PD) status message indicating whether there exists an Optical Loss of Signal (OLOS) condition at the light module; and
    determining, based on at least one of the first OLDP status message, the second OLDP status message, the first optical power status message, the second optical power status message, the LS PD status message or the digital fault status message, the first optical path as an active path and the second optical path as a standby path.

4. A method for providing optical channel protection in an optical networking system, the method comprising:
    receiving, from a light module, a digital fault status message indicating whether a digital frame demodulated from an optical signal includes a fault; and
    determining, based on the digital fault status message, a first optical path as an active path and a second optical path as a standby path;
    receiving, from the first OSC module, a first Optical Layer Defect Propagation (OLDP) status message indicating an OSC status of the super-channel on the first optical path;
    receiving, from the second OSC module, a second OLDP status message indicating an OSC status of the super-channel on the second optical path;
    receiving, from the first OADM module, a first optical power status message indicating a first measured power level of the super-channel on the first optical path;
    receiving, from the second OADM module, a second optical power status message indicating a second measured power level of the super-channel on the second optical path;
    determining, based on at least one of the first OLDP status message, the second OLDP status message, the first optical power status message, the second optical power status message, or the digital fault status message, the first optical path as an active path and the second optical path as a standby path;
    receiving, from the first OADM module, a first ramp status message indicating whether a ramp process of the super-channel in a de-multiplexing direction of the first OADM module is completed or in progress;

receiving, from the second OADM module, a second ramp status message indicating whether a ramp process of the super-channel in a de-multiplexing direction of the second OADM module is completed or in progress; and determining, based on at least one of the first OLDP status message, the second OLDP status message, the first optical power status message, the second optical power status message, the first ramp status message, the second ramp status message, or the digital fault status message, the first optical path as an active path and the second optical path as a standby path.

5. The method of claim 4, wherein the ramp process of the super channel in the de-multiplexing direction indicates a power control process in the first OADM module by adjusting attenuation level on a wavelength selective switch (WSS) device of the first OADM module to meet a transmit power on the tributary port to a predetermined target launch power of the super-channel in the first OADM module.

6. The method of claim 4, further comprising:

receiving, from the first OADM module, a first pre-ramp status message indicating whether a ramp process of the super-channel in a de-multiplexing direction of the first OADM module can be initiated;

receiving, from the second OADM module, a second pre-ramp status message indicating whether a ramp process of the super-channel in a de-multiplexing direction of the second OADM module can be initiated;

determining, based on at least one of the first OLDP status message, the second OLDP status message, the first optical power status message, the second optical power status message, the first ramp status message, the second ramp status message, the first pre-ramp status message, the second pre-ramp status message, or the digital fault status message, the first optical path as an active path and the second optical path as a standby path.

7. The method of claim 6, further comprising:

opening, based on at least one of the first OLDP status message, the second OLDP status message, the first optical power status message, the second optical power status message, the first pre-ramp status message, the second pre-ramp status message, or the digital fault status message, a first WSS device in the first OADM module to connect the first optical path to the light module; and blocking, based on at least one of the first OLDP status message, the second OLDP status message, the first optical power status message, the second optical power status message, the first pre-ramp status, the second pre-ramp status, or the digital fault status message, a second WSS device in the second OADM module to disconnect the second optical path from the light module.

8. A switching controller configured to provide optical channel protection in an optical networking system, the switching controller comprising:

a processor configured to:

receive, from a light module, a digital fault status message indicating whether a digital frame demodulated from an optical signal includes a fault; and determine, based on the digital fault status message, a first optical path as an active path and a second optical path as a standby path;

receive, from the first OSC module, a first Optical Layer Defect Propagation (OLDP) status message indicating an OSC status of the super-channel on the first optical path;

receive from the second OSC module, a second OLDP status message indicating an OSC status of the super-channel on the second optical path;

receive, from the first OADM module, a first optical power status message indicating a measured power level of the super-channel on the first optical path;

receive, from the second OADM module, a second optical power status message indicating a measured power level of the super-channel on the second optical path;

determine, based on at least one of the first OLDP status message, the second OLDP status message, the first optical power status message, the second optical power status message, or the digital fault status message, the first optical path as an active path and the second optical path as a standby path;

receive, from the first OSC module, a first Optical Layer Defect Propagation (OLDP) status message indicating an OSC status of the super-channel on the first optical path;

receive from the second OSC module, a second OLDP status message indicating an OSC status of the super-channel on the second optical path;

receive, from the first OADM module, a first optical power status message indicating a measured power level of the super-channel on the first optical path;

receive, from the second OADM module, a second optical power status message indicating a measured power level of the super-channel on the second optical path;

determine, based on at least one of the first OLDP status message, the second OLDP status message, the first optical power status message, the second optical power status message, or the digital fault status message, the first optical path as an active path and the second optical path as a standby path, wherein the optical signal includes a super-channel that is received from the first optical path or the second optical path, wherein the first optical path is operatively connected to a first Optical Supervisory Channel (OSC) module, a first Optical Add Drop Multiplexer (OADM) module and the light module, and wherein the second optical path is operatively connected to a second OSC module, a second OADM module and the light module.

9. The switching controller of claim 8, wherein the first optical path is a work path and the second optical path is a protect path.

10. The switching controller of claim 8, wherein the processor is further configured to:

receive, from the light module, a Light Source Photo Diode (LS PD) status message indicating whether there exists an Optical Loss of Signal (OLOS) condition at the light module; and determine, based on at least one of the first OLDP status message, the second OLDP status message, the first optical power status message, the second optical power status message, the LS PD status message or the digital fault status message, the first optical path as an active path and the second optical path as a stand by path.

11. A switching controller configured to provide optical channel protection in an optical networking system, the switching controller comprising:

a processor configured to:
receive, from a light module, a digital fault status message indicating whether a digital frame demodulated from an optical signal includes a fault; and
determine, based on the digital fault status message, a first optical path as an active path and a second optical path as a standby path;
receive, from the first OSC module, a first Optical Layer Defect Propagation (OLDP) status message indicating an OSC status of the super-channel on the first optical path;
receive from the second OSC module, a second OLDP status message indicating an OSC status of the super-channel on the second optical path;
receive, from the first OADM module, a first optical power status message indicating a measured power level of the super-channel on the first optical path;
receive, from the second OADM module, a second optical power status message indicating a measured power level of the super-channel on the second optical path;
determine, based on at least one of the first OLDP status message, the second OLDP status message, the first optical power status message, the second optical power status message, or the digital fault status message, the first optical path as an active path and the second optical path as a standby path,
wherein the processor is further configured to:
receive, from the first OADM module, a first ramp status message indicating whether a ramp process of the super-channel in a de-multiplexing direction of the first OADM module is completed or in progress;
receive, from a second OADM module, a second ramp status message indicating whether a ramp process of the super-channel in a de-multiplexing direction of the second OADM module is completed or in progress;
determine, based on at least one of the first OLDP status message, the second OLDP status message, the first optical power status message, the second optical power status message, the first ramp status message, the second ramp status message, or the digital fault status message, the first optical path as an active path and the second optical path as a stand by path.

12. The switching controller of claim 11, wherein the processor is further configured to:
receive, from the first OADM module, a first pre-ramp status message indicating whether a ramp process of the super-channel in a de-multiplexing direction of the first OADM module can be initiated;
receive, from a second OADM module, a second pre-ramp status message indicating whether a ramp process of the super-channel in a de-multiplexing direction of the second OADM module can be initiated;
determine, based on at least one of the first OLDP status message, the second OLDP status message, the first optical power status message, the second optical power status message, the first ramp status message, the second ramp status message, the first pre-ramp status message, the second pre-ramp status message, or the digital fault status message, the first optical path as an active path and the second optical path as a stand by path.

13. The switching controller of claim 12, wherein the processor is further configured to:
open, based on at least one of the first OLDP status message, the second OLDP status message, the first optical power status message, the second optical power status message, the first ramp status message, the second ramp status message, the first pre-ramp status message, the second pre-ramp status message, or the digital fault status message, a first WSS device in the first OADM module to connect the first optical path to the light module; and
block, based on at least one of the first OLDP status message, the second OLDP status message, the first optical power status message, the second optical power status message, the first ramp status message, the second ramp status message, the first pre-ramp status, the second pre-ramp status, or the digital fault status message, a second WSS device in the second OADM module to disconnect the second optical path from the light module.

14. An optical channel protection system comprising:
a first OSC module configured to generate a first OLDP status message indicating an OSC status of a super-channel on a first optical path;
a second OSC module configured to generate a second OLDP status message indicating an OSC status of the super-channel on a second optical path;
a first OADM module configured to generate a first optical power status message indicating a measured power level of the super-channel on the first optical path, and a first ramp status indicating whether a ramp process of the super-channel in a de-multiplexing direction of the first OADM module is completed or in progress;
a second OADM module configured to generate a second optical power status message indicating a measured power level of the super-channel on the second optical path and a second ramp status indicating whether a ramp process of the super-channel in a de-multiplexing direction of the second OADM module is completed or in progress;
a light module configured to transmit the super-channel and generate a digital fault status message indicating whether a digital frame demodulated from an optical signal include a fault; and
a switching controller configured to determine, based on at least one of the first OLDP status message, the second OLDP status message, the first optical power status message, the second optical power status message, the first ramp status, the second ramp status, or the digital fault status message, a first optical path as an active path and a second optical path as a stand by path,
wherein the optical signal includes the super-channel that is received from the first optical path or the second optical path,
wherein the first optical path is operatively connected to the first OSC module, the first OADM module and the light module, and
wherein the second optical path is operatively connected to the second OSC module, the second OADM module and the light module.

15. The optical channel protection system of claim 14, wherein the switching controller is further configured to control a selector to connect the active path to the light module.

16. An optical channel protection system comprising:
a first OSC module configured to generate a first OLDP status message indicating an OSC status of a super-channel on a first optical path;
a second OSC module configured to generate a second OLDP status message indicating an OSC status of the super-channel on a second optical path;

a first OADM module configured to generate a first optical power status message indicating a measured power level of the super-channel on the first optical path, a first ramp status indicating whether a ramp process of the super-channel in a de-multiplexing direction of the first OADM module is completed or in progress, and a first pre-ramp status indicating whether a ramp process of the super-channel in a de-multiplexing direction of the first OADM module can be initiated;

a second OADM module configured to generate a second optical power status message indicating a measured power level of the super-channel on the second optical path, a second ramp status indicating whether a ramp process of the super-channel in a de-multiplexing direction of the second OADM module is completed or in progress, and a second pre-ramp status indicating whether a ramp process of the super-channel in a de-mux direction of the second OADM module can be initiated;

a light module configured to transmit a plurality of super-channels and generate a digital fault status message for each of the plurality of super-channels indicating whether a digital frame de-modulated from an optical signal includes a fault; and a switching controller configured to determine, based on at least one of the first OLDP status message, the second OLDP status message, the first optical power status message, the second optical power status message, a first ramp status, a second ramp status, the first pre-ramp status, the second pre-ramp status, or the digital fault status message, the first optical path as an active path and the second optical path as a stand by path, wherein the optical signal includes the plurality of super-channels that is received from the first optical path or the second optical path, wherein the first optical path is operatively connected to the first OSC module, the first OADM module and the light module, and wherein the second optical path is operatively connected to the second OSC module, the second OADM module and the light module.

17. The optical channel protection system of 16, wherein the switching controller is further configured to:

open, based on at least one of the first OLDP status message, the second OLDP status message, the first optical power status message, the second optical power status message, the first ramp status message, the second ramp status message, the first pre-ramp status, the second pre-ramp status, or the digital fault status message, a first WSS device in the first OADM module to connect the first optical path to the light module; and block, based on at least one of the first OLDP status message, the second OLDP status message, the first optical power status message, the second optical power status message, the first ramp status message, the second ramp status message, the first pre-ramp status, the second pre-ramp status, or the digital fault status message, a second WSS device in the second OADM module to disconnect the second optical path from the light module.

* * * * *